(12) United States Patent
Jindal et al.

(10) Patent No.: US 12,373,988 B2
(45) Date of Patent: Jul. 29, 2025

(54) TRACKING IMAGE MODIFICATIONS FOR A DIGITAL IMAGE

(71) Applicant: Adobe Inc., San Jose, CA (US)

(72) Inventors: Amol Jindal, San Jose, CA (US); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 718 days.

(21) Appl. No.: 17/661,881

(22) Filed: May 3, 2022

(65) Prior Publication Data
US 2023/0360271 A1   Nov. 9, 2023

(51) Int. Cl.
*G06T 7/00* (2017.01)
*G06F 16/54* (2019.01)
*G06T 7/73* (2017.01)

(52) U.S. Cl.
CPC .............. *G06T 7/97* (2017.01); *G06F 16/54* (2019.01); *G06T 7/73* (2017.01); *G06T 2200/24* (2013.01); *G06T 2207/20081* (2013.01); *G06T 2207/20101* (2013.01)

(58) Field of Classification Search
CPC .............. G06T 7/97; G06T 7/73; G06F 16/54
See application file for complete search history.

(56) References Cited

U.S. PATENT DOCUMENTS

2015/0242686 A1* 8/2015 Lenka ................... G06V 10/761
382/103

OTHER PUBLICATIONS

Git; local-branching-on-the-cheap; Date downloaded Aug. 12, 2022; https://git-scm.com.
Perforce; Top Version Control System (VCS) for Your Industry; Date downloaded Aug. 12, 2022; https://www.perforce.com/solutions/version-control.
Google Cloud; DevOps tech: Version control; Date downloaded Aug. 12, 2022; https://cloud.google.com/architecture/devops/devops-tech-version-control.
Microsoft; Azure DevOps; What is source control ?; Date downloaded Aug. 12, 2022; https://docs.microsoft.com/en-US/azure/devops/user-guide/source-control?view=azure-devops.

\* cited by examiner

*Primary Examiner* — Myron Wyche
(74) *Attorney, Agent, or Firm* — Keller Preece PLLC

(57) ABSTRACT

The present disclosure relates to systems, non-transitory computer-readable media, and methods for detecting changes to a point of interest between a selected version and a previous version of a digital image and providing a summary of the changes to the point of interest. For example, the disclosed system provides for display a selected version of a digital image and detects a point of interest within the selected version of the digital image. The disclosed system determines image modifications to the point of interest (e.g., tracks changes to the point of interest) to generate a summary of the image modifications. Moreover, the summary can indicate further information concerning image modifications applied to the selected point of interest, such as timestamp, editor, or author information.

20 Claims, 15 Drawing Sheets

TRACKING IMAGE MODIFICATIONS FOR A DIGITAL IMAGE

BACKGROUND

Recent years have seen a significant increase in digital image editing. Improvements in hardware and software have enhanced the capability of individuals to create, collaborate and edit digital images. For example, hardware for modern computing devices (e.g., smartphones, tablets, servers, desktops, and laptops) enables amateurs and professionals to perform a variety of digital image editing operations individually or in a collaborative environment. Additionally, software improvements enable individuals to perform a variety of simple and complex modifications to edit and create digital images in collaboration with other individuals. For example, conventional cloud sharing environments provide platforms for individuals to share digital image files and to enhance their work by combining their skill and experience with editing digital images. Although conventional image editing systems can perform a variety of editing operations, such systems have a number of problems in relation to efficiency and accuracy—for example, conventional image editing systems merely indicate broad holistic changes to digital image files.

BRIEF SUMMARY

This disclosure describes embodiments of systems, non-transitory computer-readable media, and methods that solve one or more problems in the art and provide other benefits. For example, the disclosed systems detect changes to a point of interest between a selected version and a previous version of a digital image and display such changes to a client device based on a selection of the point of interest. In particular, the disclosed system detects a point of interest within a selected version of a digital image and determines image modifications to the point of interest between one or more previous versions and the selected version of the digital image (e.g., a digital image file shared between different users). Based on determining image modifications to the point of interest, the disclosed system provides for display a summary of the image modifications to the point of interest. In this manner, the disclosed systems allow for efficient and accurate tracking of modifications to an image at the point-of-interest level (e.g., region or object).

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
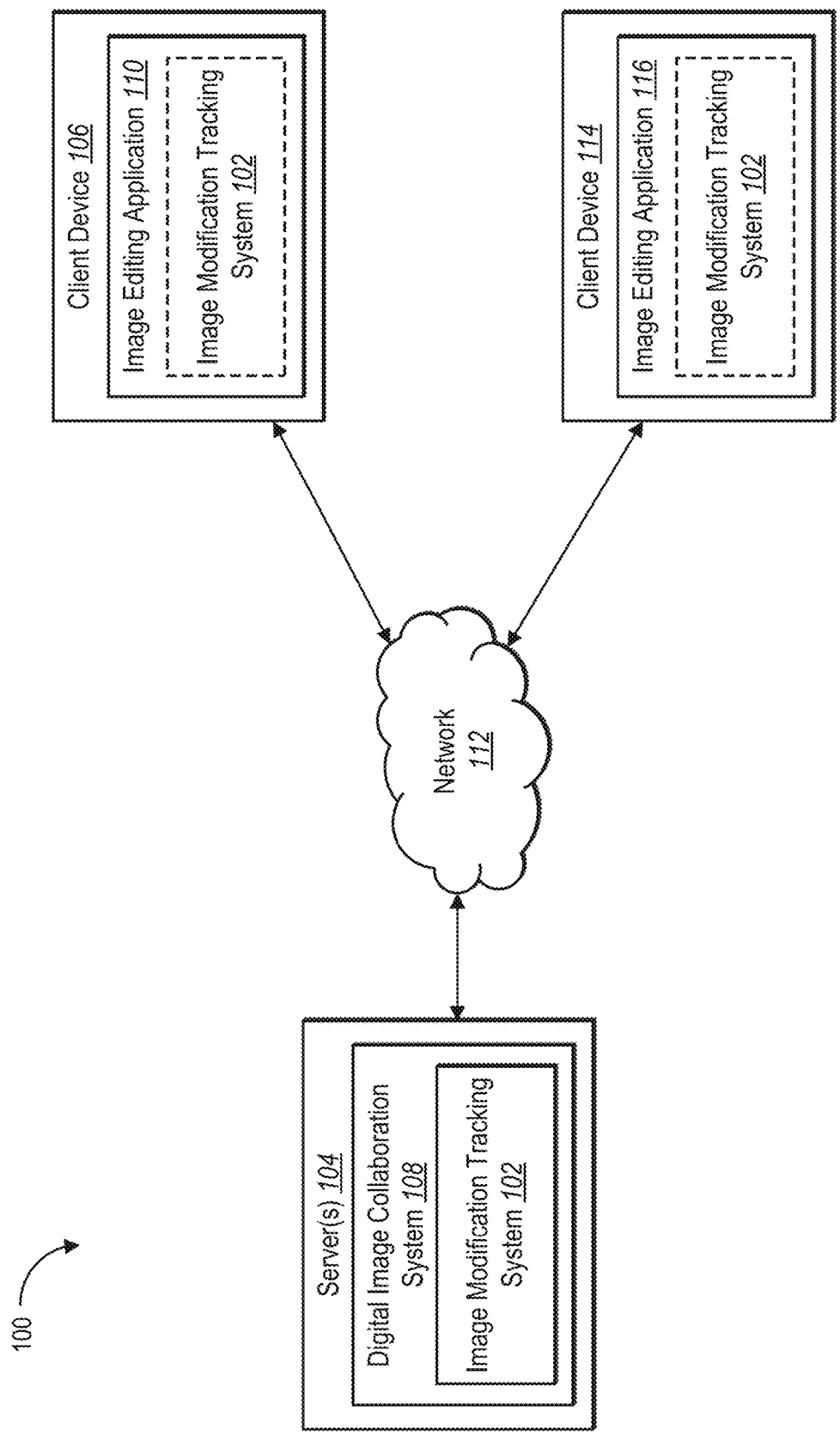
FIG. 1 illustrates a diagram of an environment in which an image modification tracking system operates in accordance with one or more embodiments.

This disclosure describes one or more embodiments of an image modification tracking system that determines and provides for display a summary of image modifications to a point of interest within a digital image. For example, the image modification tracking system allows users to track changes to a point of interest within a digital image. To elaborate, the image modification tracking system displays a selected version of a digital image and detects a point of interest within the selected version of the digital image. In particular, the image modification tracking system determines modifications to the point of interest between a currently selected version of the digital image and one or more past versions of the digital image. To illustrate, the image modification tracking system provides a summary of the modifications to a user of a client device for tracking changes to that specifically selected point of interest. Such a summary may include information concerning an image modification, such as author, type of modification, time of modification, etc.

As mentioned above, the image modification tracking system detects a point of interest. For example, detecting the point of interest includes the image modification tracking system receiving an indication from a client device of the point of interest. In particular, the image modification tracking system utilizes the point of interest indicated by a user to determine changes done in various versions of the selected digital image. To illustrate, the image modification tracking system receives an indication of a user clicking on the digital image within the graphical user interface as the point of interest and utilizes the selected point of interest to determine changes to the point of interest.

As just mentioned, in some embodiments, the image modification tracking system detects points of interest based on a user selection. For example, in response to the user selection of the point of interest, the image modification tracking system via a neural network detects the point of interest. In particular, the image modification tracking system utilizes a neural network to process the point of interest selected within the digital image. To illustrate, the image modification tracking system utilizes the neural network to determine whether the point of interest corresponds with a region or an object of the digital image. Furthermore, the image modification tracking system uses location coordinates for a region or location coordinates (e.g., object bounding box coordinates) for an object within the digital image.

As just discussed, in some cases, the image modification tracking system utilizes object bounding box coordinates. For example, the image modification tracking system utilizes object bounding box coordinates for tracking when an object selected as a point of interest moves in different versions of a digital image. In particular, the image modification tracking system utilizes bounds of an object selected as the point of interest and determines a change in location of the object based on comparing the bounds to previous versions of the digital image. Furthermore, the change in position of an object indicates an image modification to the point of interest.

As further mentioned above, the image modification tracking system determines image modifications to the point of interest. For example, the image modification tracking system utilizes an image metadata file for recording image modifications to various versions of a digital image. In particular, with each iteration of a digital image, the image modification tracking system can track modifications made to the digital image by recording the modifications within the image metadata file. To illustrate, for a digital image file with five different versions (each with image modifications), the image modification tracking system generates and updates an image metadata file for all the image modifications for the five different versions. Furthermore, the image modification tracking system receives bounds corresponding to a point of interest and determines differences between the selected point of interest and the point of interest corresponding to previous versions by utilizing the image metadata file.

When identifying image modifications to the point of interest, in some cases, the image modification tracking system detects image modifications to a region. To do so, in certain embodiments, the image modification tracking system receives pixel value(s) of the point of interest and determines the point of interest intersects with a region. In particular, the image modification tracking system determines the intersection from multiple versions of the digital image listed within the image metadata file. From the multiple versions of the digital image, the image modification tracking system determines that the point of interest intersects with bounds for a region, rather than bounds for an object. To illustrate, in some cases, the image modification tracking system generates a list of the image metadata file for the modifications to the regional point of interest.

Additionally, or alternatively, when identifying image modifications to the point of interest, in some cases, the image modification tracking system detects an image modification to an object. To do so, in some cases, the image modification tracking system receives pixel values corresponding to the point of interest and determines the point of interest as an object. In particular, based on multiple versions of the digital image within the image metadata file, the image modification tracking system determines the point of interest corresponds with an object.

Based on determining an image modification to a point of interest, the image modification tracking system provides for display a summary of the modification to the point of interest. For example, in some embodiments, the summary includes textual information relating to modifications to the point of interest. In particular, the summary of a modification may include a textual description of the modification and corresponding information, such as (i) image modification authors, image modification types, timestamps corresponding with image modifications and/or (ii) digital image versions for image modifications.

In addition to a textual description and/or other information related to an image modification, in some cases, a summary of one or more image modifications includes textual or graphic information to locate or identify particular image modifications. For instance, in some cases, the summary of the modifications to the point of interest also includes a searchable list. To illustrate, a client device can search a summary of modifications by modification type to determine whether any brush strokes were applied to the selected point of interest. In addition to the textual summary list of the modifications, in some embodiments, the image modification tracking system also provides visual indicators for image modifications. For example, the image modification tracking system provides a visual indicator corresponding to the point of interest to show, within a version of the digital image, the image modifications to the point of interest. In particular, visual indicators include the image modification tracking system generating an object mask to highlight modifications related to the point of interest.

As suggested above, the image modification tracking system can provide summaries to a client device that is specific to one or more versions of a digital image. For example, the summary can include an option of providing the user with various versions of a digital image. In particular, when the client device detects a user selection of a version of the digital image, the image modification tracking system summarizes modifications in a graphical user interface by reference to a version immediately prior to the selected version. To illustrate, if the client device detects a user selection of the third version of a digital image, the summary shows modifications between the second version and the third version of the digital image.

Moreover, in addition to the above, in one or more implementations, the image modification tracking system generates new versions of a digital image based on modifications applied to a digital image. In particular, in response to modifications, the image modification tracking system also generates the above-mentioned image metadata file that corresponds with the composite image modifications applied to a digital image. Furthermore, to illustrate, the image modification tracking system receives a user selection of a point of interest and utilizes the various versions and image metadata file to provide a summary of image modifications that corresponds with the point of interest.

Recent years have seen significant improvements in editing images within conventional image editing systems. For example, conventional image editing systems can identify holistic changes to a digital image file. In particular, conventional image editing systems can identify when a previous file for a digital image generally differs from a more recent file version of the digital image. To illustrate, in response to a user accessing a digital image file from a conventional image editing system that uses a cloud sharing system, conventional image editing systems can indicate to the user that some generic type of change occurred to the digital image file—but without details.

Unfortunately, a generic indicator of an image change by a conventional image editing system foments inefficient searching, graphic-user-interface comparison, or other computing interactions. For example, identifying holistic changes to a digital image file only provides a high-level indication to the user accessing the digital image file that changes were previously applied to the digital image file. Because only holistic changes to the digital image file are indicated, the user may need to utilize computational resources to attempt to identify modified regions or objects of the digital image. For complex digital image files that contain multiple layers, utilizing computational resources to try and identify modified regions or objects of the digital image taxes both time and computational resources.

Because conventional image editing system merely indicate some generic, unspecific change has taken place to an image, client devices may have to locally save a digital image file or save a separate digital image file on a cloud system in addition to a collaborative digital image file on the cloud system. In particular, client devices save digital image files locally or on a cloud system to facilitate visually comparing digital image files for a user to determine modifications. For instance, because conventional systems only provide holistic changes, if the user needs to determine modifications to the collaborative digital image file, the user may use a manual eye comparison between the different digital image files. This is both inaccurate and inefficient because the human eye cannot accurately and efficiently identify pixel changes within digital images.

Along related lines, a client device may need to perform a sequence of operations to reverse modifications applied by different users or client devices. To illustrate, a client device of a conventional image editing system may determine to utilize a variety of editing tools, such as brushes, paint tools, erasers, filters, machine learning models, and layers, to restore the digital image file to a satisfactory state. Due to conventional systems limitations of merely identifying holistic changes to the digital image file, the client device must employ the aforementioned editing tools to restore portions of the digital image file. In doing so, conventional systems consume additional computational resources.

In improvements over conventional image editing systems, the disclosed image modification tracking system solves a number of technical deficiencies with regard to efficiency, accuracy, and flexibility. For instance, the image modification tracking system improves on the efficiency of conventional image editing systems by tracking the changes to a selected point of interest within a digital image (e.g., a region or an object). The image modification tracking system accomplishes such image-change tracking by detecting a point of interest and determining an image modification to the point of interest between a previous version and the selected version of the digital image. The image modification tracking system subsequently provides for display the determined image modifications to a user. Rather than merely identifying holistic changes to a digital image file, the image modification tracking system provides for specific tracking of changes to a region or object within the digital image. The disclosed image-modification-specific tracking increases both efficiency and accuracy of collaboration between client devices editing a digital image.

In addition to increased efficiency, unlike conventional image editing systems, a client device of the image modification tracking system does not have to navigate between graphical user interfaces of different versions of digital image files to determine modifications. For example, the image modification tracking system determines image modifications to a point of interest and provides a summary to the user relating to those modifications. In doing so, the image modification tracking system efficiently presents to the client device with a summary of image modifications to a selected point of interest or presents different modified versions of the digital image file that corresponds with the selected point of interest. By presenting a concise summary of image modifications or a summary of changes between different versions, the image modification tracking system eliminates the need to save a digital image file locally or save the digital image file separately on the cloud—because the image modification tracking system can iterate through previous versions of the selected version to determine the image modifications to a selected point of interest and present a concise summary of such image modifications.

In addition to navigation-for-comparison improvements, the image modification tracking system also eliminates the need for client devices to navigate between multiple graphical user interfaces to perform further image modifications. Instead of the client device utilizing a variety of editing tools to restore a digital image file to a previous version, a client device of the disclosed image modification tracking system instead can browse through previous versions of the selected point of interest and select a previous version to restore. Accordingly, by tracking changes to a point of interest, the image modification tracking system provides an improved graphical user interface that reduces multiple interfaces and navigation operations.

In addition to image-modification-specific-tracking improvements, in one or more implementations, the image modification tracking system introduces a feature that stores and curates image modifications by the point of interest. For example, by providing a searchable list of the image modifications for a point of interest, the image modification tracking system efficiently allows a user to identify modifications and shuffle through the changes within the image editing application. In particular, as compared to conventional image editing systems, the image modification tracking system provides relevant details (e.g., image modification author, timestamps, modification types) for changes to a point of interest instead of just broad indications that a digital image file changed. Accordingly, the image modification tracking system improves the graphical user interface by providing a summary of changes and corresponding change information to a point of interest within a single interface.

As illustrated by the foregoing discussion, the present disclosure utilizes a variety of terms to describe features and advantages of the image capturing system. Additional detail is now provided regarding the meaning of such terms. As mentioned above, the image modification tracking system detects a point of interest. For example, as used herein, the term "point of interest" refers to content within a digital image that has been selected or otherwise detected as of interest. In particular, a point of interest includes one or more pixel values corresponding to a region or object within a digital image that have been selected by a computing device. In some cases, a client device selects or automatically detects a point of interest. To illustrate, in some embodiments, the image modification tracking system can utilize a machine learning model to determine commonly selected regions based on multiple image classification tags, and in response, automatically selects a region.

As mentioned above, the image modification tracking system, in one or more implementations detects the point of interest as a region. For example, as used herein, the term "region" refers to an area with a boundary depicted in a digital image. In particular, a region includes an area defined by coordinates within a digital image, such as backgrounds or foregrounds. To illustrate, in some embodiments, a region includes a text box, the sky, the mountains, the upper half of a digital image, the bottom half of a digital image, the left half of the digital image, the right half of the digital image, or other of portions within the digital image. In some instances, a region refers to shadow regions within a digital image or color demarcations.

On the other hand, the image modification tracking system in other instances detects the point of interest as an object. For example, as used herein, the term "object" refers to a collection of pixels in a digital image that depicts a person, place, or thing. To illustrate, in some embodiments, an object includes a person, an item, a natural object (e.g., a tree or rock formation) or a structure depicted in a digital image. In some instances, an object refers to a plurality of elements that, collectively, can be distinguished from other elements depicted in a digital image. For example, in some instances, an object includes a collection of buildings that make up a skyline. In some instances, an object more broadly includes a (portion of a) foreground or other element(s) depicted in a digital image as distinguished from a background.

As mentioned above, the image modification tracking system detects a point of interest for a selected version of the digital image. For example, as used herein, the term "selected version" refers to a digital image currently chosen by a client device associated with a user of the image modification tracking system. In particular, a selected version includes a client device opening a digital image file from a digital collaboration cloud within an image editing application. In particular, in some embodiments, the selected version includes the image modification tracking system providing for display to the client device the selected version of the digital image on a graphical user interface. In providing for display the selected version, the client device can perform a number of operations on the digital image, such as selecting a point of interest or any number of image editing operations.

Further, the image modification tracking system determines image modifications to the point of interest based on identifying previous versions of the digital image. For example, as used herein, the term "previous version" refers to one or more prior digital image files that correspond with a selected version of digital image file. In particular, previous version includes versions of the digital image saved on a digital collaboration cloud or saved locally on a client device that acted as a precursor to the selected version of the digital image. To illustrate, if a client device associated with a user performed image modifications to version 1 of a digital image and saved the modifications, the image modification tracking system generates version 2 of the digital image with the modifications. Version 1 of the digital image is the previous version of version 2. Furthermore, for a digital image with multiple versions, if the image modification system generates a version 5, then versions 1-4 are considered the previous versions.

As also mentioned above, the image modification tracking system determines image modifications. For example, as used herein, the term "image modification" refers to any change, alteration, or enhancement performed to or on a digital image file. In particular, the term image modification includes any change, alteration, or enhancement of pixels within the digital image file. To illustrate, image modification includes the addition of a shape, the use of a brush, the addition of a layer, or a color change. Any change between a selected version and a previous version includes an image modification. For instance, changes to the pixel values of a digital image results in an image modification.

As discussed above, the image modification tracking system utilizes an image metadata file to determine image modifications. For example, as used herein, the term "image metadata file" refers to a file that records metadata from a digital image. In particular, an image metadata file includes a file for a series of accompanying files (e.g., digital image files) that correspond to a digital image and records metadata, such as file name, digital image version, image modification authors, image modification types, constituent files, and timestamps. To illustrate, for each version of a digital image that is modified, the image metadata file records the metadata for each modification and utilizes the metadata for tracking changes to a point of interest. Moreover, the image modification tracking system tracks changes to a point of interest selection within a digital image as compared to previous versions of the digital image. For instance, in one or more implementations, an image metadata file includes a Manifest file.

As used herein, the term "machine-learning model" refers to a computer algorithm or a collection of computer algorithms that automatically improve performing a particular task through experience based on use of data. For example, a machine-learning model can utilize one or more learning techniques to improve in accuracy and/or effectiveness. Example machine-learning models include various types of decision trees, support vector machines, Bayesian networks, or neural networks. In some cases, a machine-learning model constitutes a deep neural network (e.g., convolutional neural network) or a series of decision trees (e.g., random forest, XGBoost), while in other cases a machine-learning model constitutes a multilayer perceptron, a linear regression, a support vector machine, a deep tabular learning architecture, a deep learning transformer (e.g., self-attention-based-tabular transformer), or a logistic regression.

As just mentioned, the detection machine learning model includes neural networks. As used herein, the term "neural network" refers to a type of machine learning model, which can be tuned (e.g., trained) based on inputs to approximate unknown functions used for generating the corresponding outputs. In particular, in some embodiments, a neural network refers to a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

As mentioned above the image capturing system utilizes a detection machine learning model. For example, as used herein, the term "detection machine learning model" refers to a computer-implemented machine learning model that detects objects or regions within a digital image. Indeed, in some implementations, a detection machine learning model includes a model that analyzes a digital image and identifies one or more regions or objects portrayed in the digital image. Furthermore, the "detection machine learning model" includes detection neural networks and detection artificial intelligence models.

Furthermore, as previously mentioned, the image modification tracking system utilizes bounds of a point of interest. For example, as used herein, the term "bounds" refers to a defined area within a digital image. In particular, bounds include a boundary defined by location identifiers or coordinates that surrounds a region or an object within a digital image. To illustrate, the image modification tracking system can utilize rectangular bounds to enclose a selected object detected within the digital image. For instance, the image modification tracking system utilizes a neural network to detect bounds that correspond to a selected point of interest. Furthermore, the image modification tracking system utilizes the detected bounds for identifying previous versions within the image metadata file that corresponds with the selected point of interest.

Additionally, as mentioned above, the image modification tracking system provides summaries to the user that corresponds with a point of interest. In some instances, the image modification tracking system utilizes visual indicators such as an object mask. For example, as used herein, the term "object mask" refers to a demarcation useful for partitioning a digital image into separate portions. In particular, in some embodiments, an object mask refers to an identification of a portion of the digital image (i.e., pixels of the digital image) belonging to one or more objects and a portion of the digital image belonging to a background and/or other objects. For example, in some embodiments, an object mask includes a map of a digital image that has an indication for each pixel of whether the pixel corresponds to part of an object or not. In some implementations, the indication includes a binary indication (e.g., a "1" for pixels belonging to the object and a "0" for pixels not belonging to the object). In alternative implementations, the indication includes a probability (e.g., a number between 1 and 0) that indicates the likelihood that a pixel belongs to an object. In such implementations, the closer the value is to 1, the more likely the pixel belongs to an object and vice versa.

Additional detail regarding the image capturing system will now be provided with reference to the figures. For example, FIG. 1 illustrates a schematic diagram of a system environment 100 that includes an image modification tracking system 102, a digital image collaboration system 108, server(s) 104, a network 112, client devices 106 and 114, and image editing applications 110 and 116.

Although the system environment 100 of FIG. 1 is depicted as having a particular number of components, the system environment 100, in one or more implementations, has another number of devices or additional/alternative components (e.g., server devices, client devices, or other components in communication with the image modification tracking system 102 via the network 112). Similarly, although FIG. 1 illustrates a particular arrangement of the server(s) 104, the network 112, and the client devices 106 and 114, various additional arrangements are possible.

As shown in FIG. 1, the server(s) 104, the network 112, and the client devices 106 and 114 are communicatively coupled with each other either directly or indirectly (e.g., through the network 112 discussed in greater detail below in relation to FIG. 12). Moreover, the server(s) 104 and the client devices 106 and 114 include computing devices such as those discussed in greater detail with relation to FIG. 12.

As further shown in FIG. 1, the system environment 100 includes the server(s) 104, which in one or more implementations, implements the image modification tracking system 102, and the digital image collaboration system 108. In one or more embodiments, the server(s) 104 generates, stores, receives, and/or transmits data including digital image modifications, detection data, segmentation masks, digital image metadata, and digital images. For example, in some embodiments, the server(s) 104 receives a modified digital image and generates a new version of the digital image and tracks the modifications between the selected version and previous versions of the digital image.

To provide an example implementation, in some embodiments, the image modification tracking system 102 supports the digital image collaboration system 108 on the server(s) 104. For example, utilizing the image modification tracking system 102 on the server(s) 104, when different client devices such as client device 114 or client device 106 access the same digital image file via the network 112, the image modification tracking system 102 provides a summary of modifications to a point of interest. For example, the client device 106 saves a digital image file via the network 112 to the digital image collaboration system 108. The digital image collaboration system 108 provides the client device 114 access to the digital image file saved by client device 106. Accordingly, the client device 114 can perform modifications on the digital image file and also save it to the server(s) 104.

In one or more embodiments, the client devices 106 and 114 respectively include the image editing applications 110 and 116 to collaborate with other client devices, modify, and/or generate for display digital image files. For example, in some embodiments, one or more of the client devices 106 and 114 comprises a smartphone, tablet, desktop computer, laptop computer, head-mounted-display device, or other electronic device. Optionally, in some embodiments, the client devices 106 and 114 further include components of the image modification tracking system 102 hosted on the server(s) 104 that allows a user of the client devices 106 and 114 to receive a summary of image modifications made to a digital image file by any client device. Additionally, or alternatively, the system environment 100 optionally includes the client devices 106 and 114 hosting the image modification tracking system 102, which provides summaries of image modifications to a point of interest for locally saved files.

In one or more alternative implementations, the image modification tracking system 102 (in whole or part) is implemented by the server(s) 104 and the client devices 106 and 114. For example, in one or more implementations, the image modification tracking system 102 resides on both the server(s) 104 and the client devices 106 and 114 to provide summaries of modifications to a point of interest for cloud base collaborative digital image files and for files stored locally on the client device.

Indeed, the image modification tracking system 102 is able to be implemented in whole, or in part, by the individual elements of the system environment 100. Indeed, although FIG. 1 illustrates the image modification tracking system 102 implemented with regard to the server(s) 104, different components of the image modification tracking system 102 are able to be implemented by a variety of devices within the system environment 100. For example, in one or more implementations, one or more (or all) components of the image modification tracking system 102 are implemented by a different computing device (e.g., the client devices 106 and 114 or another remote server/client device).

Figure 2:
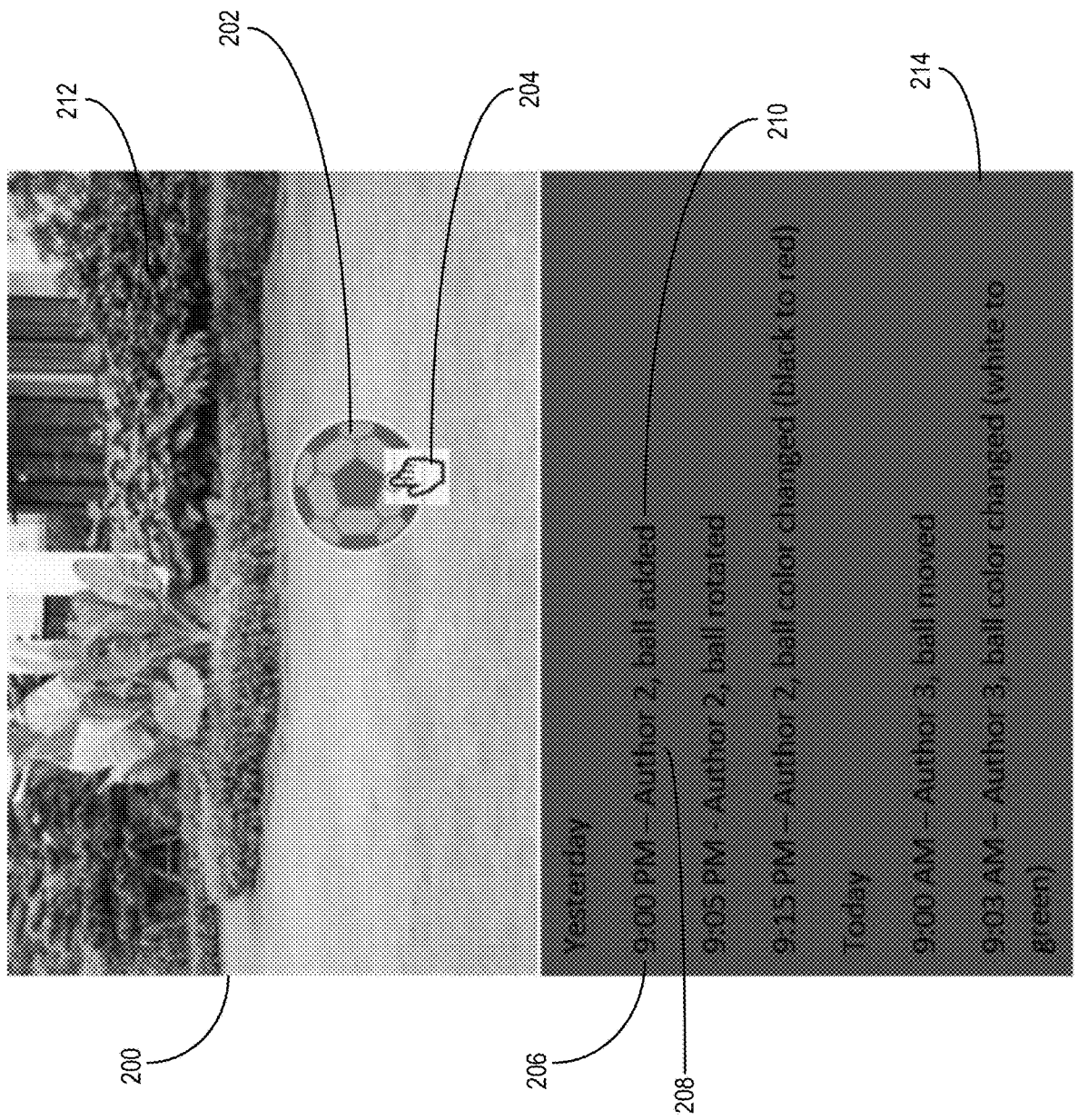
FIG. 2 illustrates the image modification tracking system providing for display via a graphical user interface of a client device, image modifications to a point of interest in accordance with one or more embodiments.

As discussed above, the image modification tracking system 102 provides for display a summary of image modifications to a point of interest. For example, FIG. 2 illustrates an overview of a graphical user interface comprising a summary of image modifications. Specifically, FIG. 2 illustrates a user of a client device selecting a point of interest, and the image modification tracking system 102 providing for display a summary of the image modifications to the selected point of interest.

As just mentioned, FIG. 2 shows a graphical user interface 212 of the image modification tracking system 102. For example, the image modification tracking system 102 uses the graphical user interface 212 to display digital images using an image editing application. Prior to display of the graphical user interface 212, a client device detects image modifications to a version of the digital image using the image editing application. By executing instruction of the image editing application, the client device accesses and modifies digital image files based on the detected image modifications. Such modifications can be made and stored locally on the client device or stored remotely on the digital image collaboration system 108 (e.g., a cloud collaboration system). After the image modifications are stored, via the graphical user interface 212 of the image editing application, in some instances, a user of the same or different client device selects a version of a digital image 200 from the digital image collaboration system 108 saved to the digital image collaboration system 108.

As discussed previously, after detecting a selection of and displaying the digital image 200, the image modification tracking system 102 detects a point of interest 204 within the selected version of the digital image 200. For example, the client device detects a user selection of the point of interest 204 via the graphical user interface 212. For instance, a user of the client device accesses the digital image 200 and taps a location within the digital image 200 to indicate the point of interest 204. In response to a selection within the digital image 200, in some cases, the image modification tracking system 102 provides to the client device a prompt to confirm that the user of the client device is interested in viewing modifications to the selection.

As discussed above, the image modification tracking system 102 can detect the point of interest 204 as an object or a region. For example, as shown in FIG. 2, the client device detects a user selection of an object 202 within the digital image 200. In particular, FIG. 2 shows the selection of the soccer ball. This disclosure further describes the determination process by the image modification tracking system 102 that the selected point of interest 204 corresponds to a region or an object with respect to FIGS. 5 and 6. Although FIG. 2 shows the selection of the object 202, the selected point of interest 204 in other implementations includes a region, such as the background vegetation or the grass of the selected version of the digital image.

Based on detecting the point of interest 204, the image modification tracking system 102 provides for display, in the graphical user interface 212, a summary 214. In response to receiving a selection of the point of interest 204, for instance, the image modification tracking system 102 provides for display on the graphical user interface 212 the summary 214. As shown in FIG. 2, the summary 214 includes a textual description of image modifications to the selected point of interest 204.

As illustrated in FIG. 2, the summary 214 includes information corresponding to one or more image modifications, such as a timestamp 206, an image modification author 208, and an image modification type 210—each corresponding to a specific image modification. The displayed information relates to the selected point of interest 204 and assists the user of the client device in determining details of modifications to the point of interest 204. This disclosure describes and depicts different summaries of image modifications further below with respect to FIGS. 7A-7C and 8A-8E.

Figure 3:
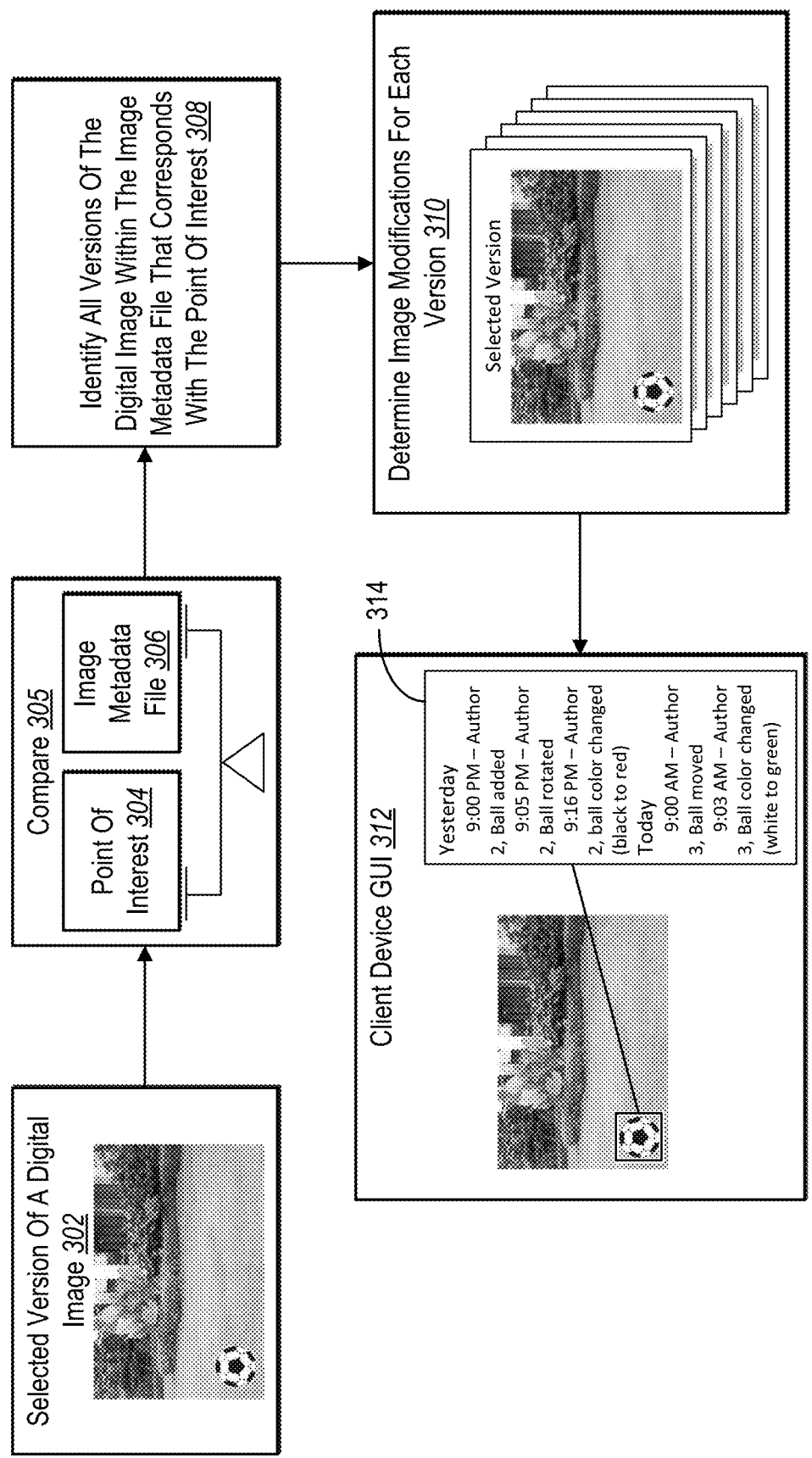
FIG. 3 illustrates an overview block diagram of the image modification tracking system detecting changes to a point of interest between a selected and previous version of a digital image and displaying such changes to a client device based on a selection of the point of interest in accordance with one or more embodiments.

As discussed above, the image modification tracking system 102 detects a point of interest and determines image modifications to the point of interest. In accordance with one or more embodiments, FIG. 3 illustrates an overview of the image modification tracking system 102 tracking image modifications to a point of interest. Specifically, FIG. 3 illustrates the image modification tracking system 102 receiving an indication of a selected version of a digital image, detected a point of interest 304, and determining image modifications based on the selected point of interest 304.

As discussed previously, a client device receives an indication of a user selection of a digital image. For example, FIG. 3 illustrates the selected version of the digital image 302. In particular, the client device detects a user selection of a version of a digital image file stored locally or remotely on a cloud (e.g., the digital image collaboration system 108) to open the digital image file on an image editing application. The client device further displays the selected version of the digital image 302 on a client device. For instance, the client device uploads a digital image to the image editing application or accesses a digital image from a cloud to open on the image editing application.

After receiving an indication of the selected version of the digital image 302, the client device detects a user selection of the point of interest 304 within the selected version of the digital image 302, as discussed previously in FIG. 2. For example, in one or more implementations the client device detects a user selection of the point of interest 304, while, in other instances, the image modification tracking system 102 automatically selects the point of interest 304. In particular, in some cases, the image modification tracking system 102 can automatically select the point of interest 304 utilizing a selection machine learning model. To illustrate, based on classification tags identified by the selection machine learning model, the image modification tracking system 102 determines a theme of the digital image and identifies a region/object most likely to be selected and automatically selects that region/object.

For example, in some embodiments, a selection machine learning model determines a regions/object with a high likelihood of selection. To illustrate, the image modification tracking system 102 via the selection machine learning model encodes classification tags, such as scenic background tags and object tags from a training set of digital images (e.g., using one hot encoding, an encoding layer, or a vector mapping) and then processes the encoding utilizing the selection machine learning model to determine a region/object with a high likelihood of selection based on past results.

After detecting a selection of the point of interest 304, in some embodiments, the image modification tracking system 102 utilizes metadata from the point of interest 304 to perform an act of comparing 305 the selected point of interest 304 with an image metadata file 306. As previously mentioned, an image metadata file contains image modifications to the selected version of the digital image 302. By using a record of image modifications from the image metadata file, the image modification tracking system 102 compares the point of interest 304 with the image metadata file 306 to determine modifications across different versions of the digital image. Examples of an image metadata file are discussed in more detail in FIGS. 4, 5, and 6.

Based on the act of comparing 305 the point of interest 304 with the image metadata file 306, the image modification tracking system 102 performs an act 308 of identifying all versions of the selected version of the digital image 302 within the image metadata a file 306 that corresponds with the point of interest 304. In particular, the details of the image modification tracking system 102 identifying different versions of the selected version of the digital image 302 corresponding to the point of interest 304 are described below with respect to FIGS. 4, 5, and 6.

In addition to identifying all versions corresponding to the point of interest 304 of the selected version of the digital image 302, the image modification tracking system 102 also determines image modifications for each identified version. For example, the image modification tracking system 102 performs an act 310 of determining image modifications for each version. This disclosure describes determining image modifications in more detail below with respect to FIGS. 4, 5, and 6.

Based on detecting the point of interest 304 and determining the image modifications, the image modification tracking system 102 provides, for display in a graphical user interface, a summary of the image modifications to the point of interest 304. For example, as shown in FIG. 3, a graphical user interface 312 of a client device includes a bounding box surrounding the point of interest 304. In particular, the graphical user interface 312 also includes a summary 314 corresponding to the point of interest 304. The summary 314 shows a multitude of modifications to the point of interest 304. More examples of a summary displayed in a graphical user interface are given below with respect to FIGS. 7A-7C and 8A-8E.

Figure 4:
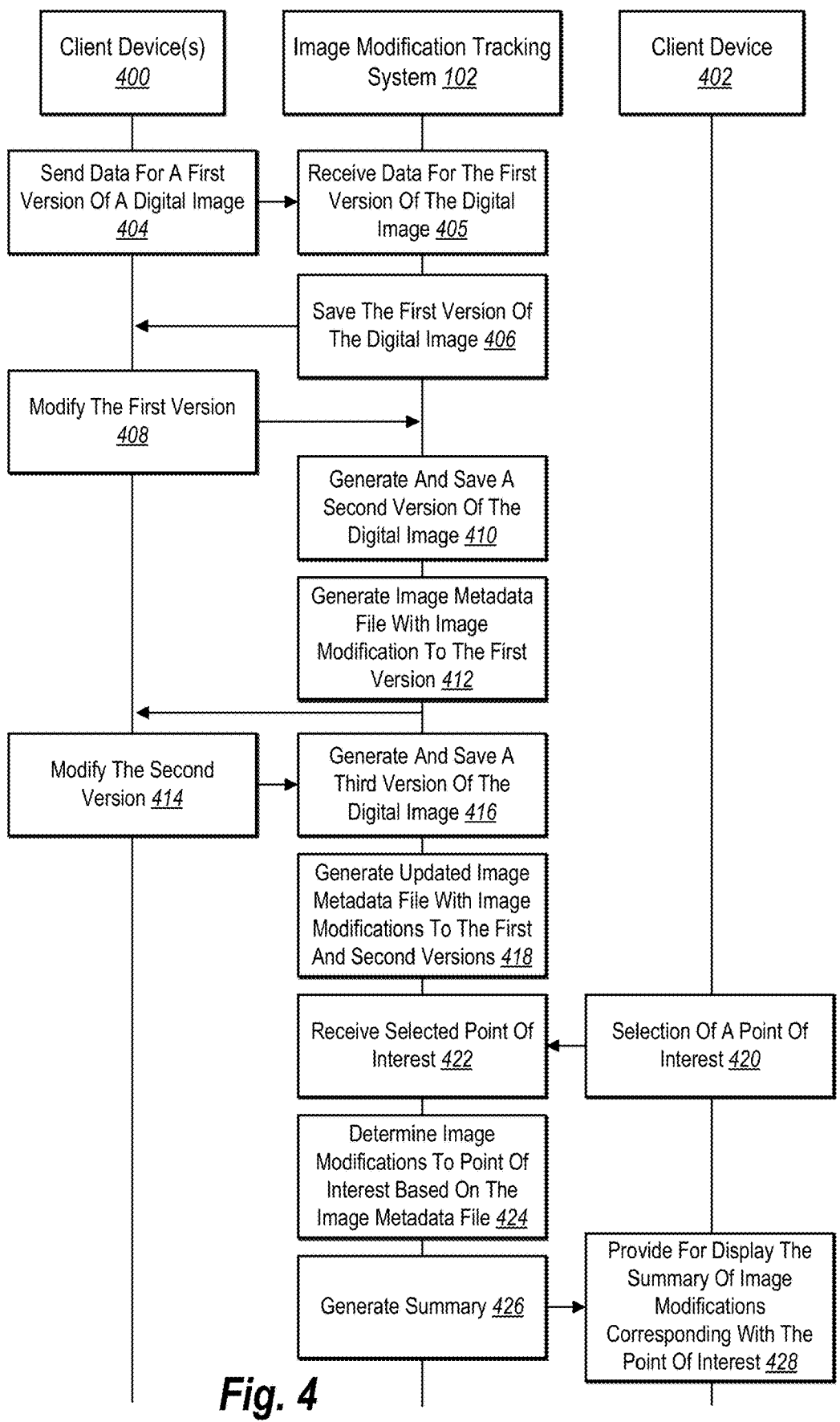
FIG. 4 illustrates a wireline diagram of the image modification tracking system receiving different versions of a digital image and determining image modifications to a point of interest in accordance with one or more embodiments.

As mentioned above, the image modification tracking system 102 generates different versions of a digital image for modifications performed on the digital image and generates the image metadata file to record the modifications performed on the digital image. FIG. 4 illustrates an example wireline diagram of the sequential interactions between components, such as client devices and the image modification tracking system 102. Specifically, FIG. 4 shows the image modification tracking system 102 receiving data for a first version of a digital image and generating a second version in response to modifications. Furthermore, FIG. 4 shows the image modification tracking system 102 generating an image metadata file to track the modifications to the different versions of the digital image. Moreover, FIG. 4 also shows a client device selecting a point of interest within one of the versions of the digital image and the image modification tracking system 102 providing for display on the client device a summary of the image modifications to the point of interest. For ease of reference, the following paragraphs describe client device(s) 400 performing acts 404, 408, and 414, while client device 402 performs acts 420 and 428. But the client device(s) 400 and client device 402 in one or more implementations could perform each other's acts.

As just mentioned, FIG. 4 shows the image modification tracking system 102 receiving data for a first version of a digital image. For example, FIG. 4 shows a first version of the digital image sent from client device(s) 400. In particular, FIG. 4 shows the client device(s) 400 performing an act 404 of sending data for the first version of a digital image. To illustrate, the act 404 of sending data for the first version of the digital image to the image modification tracking system 102 includes the client device(s) 400 uploading and saving the digital image to the image modification tracking system 102 (e.g., via the digital image collaboration system 108).

Based on the client device(s) 400 performing the act 404 of sending data, the image modification tracking system 102 receives the data from the client device(s) 400. In particular, FIG. 4 shows the image modification tracking system 102 performing an act 405 of receiving data for the first version of the digital image. To illustrate, as mentioned above, the act 405 of receiving data includes receiving metadata components of the digital image, such as the author, timestamps, pixel value data, and modification data.

In addition to the image modification tracking system 102 performing the act 405 of receiving data, the image modification tracking system 102 also saves the received data of the first version of the digital image. In particular, the image modification tracking system 102 performs an act 406 of saving the first version of the digital image. To illustrate, in response to receiving the metadata components corresponding to the first version of the digital image, the image modification tracking system 102 retains the first version of the digital image within the digital image collaboration system 108. Retaining the first version of the digital image within the digital image collaboration system 108 provides the client device(s) 400 and the client device 402 access to the first version of the digital image.

In addition to the act 406 of saving the first version of the digital image, the client device(s) 400 modifies the digital image. For example, the image modification tracking system 102 performs the act 406 of saving the first version of the digital image. After saving this particular version of the digital image, the client device(s) 400 access the first version of the digital image for modifying the first version of the digital image. In particular, the client device(s) 400 perform an act 408 of modifying the first version of the digital image, and the image modification tracking system 102 receives the modifications applied to the first version of the digital image. To illustrate, the modifications to the first version include image-modification operations, such as applying brush strokes, moving objects, adding layers, applying paint tools, erasers, blurring tools, and filters. The application of any modifications to the first version of the digital image by the client device(s) 400 results in the client device(s) 400 sending image modification data and the image modification tracking system 102 receiving the image modification data. In part, the image modification tracking system 102 receiving the modifications to the first version occurs because the first version of the digital image is stored on the digital image collaboration system 108.

In response to the image modification tracking system 102 receiving the image modification data from the client device(s) 400 performing the act 408 of modifying the first version of the digital image, the image modification tracking system 102 generates a second version of the digital image. For example, FIG. 4 shows the image modification tracking system 102 performing an act 410 of generating and saving a second version of the digital image. In particular, like the act 406, the act 410 of generating and saving the second version of the digital image is based on data reflecting the act of the client device(s) 400 modifying the first version of the digital image. Furthermore, in addition to the act 410 of generating and saving the second version of the digital image, the image modification tracking system 102 continues to retain the first version of the digital image. In some embodiments, the image modification tracking system 102 retains all versions of a digital image in order to track modifications applied to a digital image.

In one or more implementations, the image modification tracking system 102 receives data for a digital image (e.g., act 405) upon a save action performed within the image editing application. For example, in some embodiments, the client device(s) 400 sends data for a version of the digital image upon manually saving the digital image within the image editing application. Furthermore, the client device(s) 400 also send data in response to the image editing application auto-saving the digital image. In particular, the image modification tracking system 102 generates a new version of the digital image upon receiving image modification data from the client device(s) 400. To illustrate, the image modification tracking system 102 caches metadata information of the digital image and generates a new version of the digital image with each save action received from the client device(s) 400.

In one or more implementations, for caching metadata information, the image modification tracking system 102 compares the most recently saved version of the digital image with the last version of the digital image for purposes of storing the image modifications. In particular, for an image editing application, such as PHOTOSHOP, the image modification tracking system 102 in response to caching metadata information saves the digital image PHOTOSHOP file as PSDC format, which is a native file format for a cloud collaboration environment.

In addition to the act 405 and the image modification tracking system 102 receiving image modification data, in one or more implementations, the image modification tracking system 102 resolves conflicting data that comes from multiple client devices working in parallel on the same digital image file. In particular, to reduce computational burdens, in some cases, the image modification tracking system 102 merges a plurality of digital image versions from a single client device into a single version. To illustrate, in one or more implementations, to merge the digital image versions, the image modification tracking system 102 generates a single version of the digital image with the multiple image modifications performed by the same client device within a short period of time.

To further illustrate merging or consolidation of multiple image modifications, in one or more implementations, multiple client devices associated with different users perform multiple modifications to a digital image. In particular, the image modification tracking system 102 receives data from a digital image for a particular version in short intervals (every 1-2 minutes) either from an automatic or manual save action performed by client devices. For a digital image where a multitude of users are working in parallel and performing modifications every couple of minutes, the image modification tracking system 102 reduces computational burdens by treating all modifications performed by a single device (in a single session) as one version of the digital image. Accordingly, the image modification tracking system 102 still tracks all modifications performed by different users on a digital image and reduces computational burdens by not generating hundreds of versions of the digital image.

By contrast, in other implementations, a first client device accesses a digital image and modifies the digital image within the image editing application while offline. When a second client device accesses the same digital image from the digital image collaboration system 108 and performs substantially similar modifications to the digital image, the multiple image modifications present potential conflicts of redundancy when the second client device saves that digital image. When the first client device returns online and attempts to synchronize the modified digital image with the digital image saved on the digital image collaboration system 108, the image modification tracking system 102 identifies potential conflicts between the two saved versions. To illustrate, the image modification tracking system 102 identifies a version conflict between the first and second client devices and to resolve this, the image modification tracking system 102 sends to the image editing application of the first client device, the second client device's modifications to the digital image. In this way, the first client device can determine whether the modifications to the digital image are satisfactory and then save the digital image to the digital image collaboration system 108.

Turning from the act 405 and the image modification tracking system 102 receiving data relating to the digital image, the image modification tracking system 102 in response to the act 410 of generating and saving the second version of the digital image generates an image metadata file. For example, in response to the act 408 of modifying the first version of the digital image, the image modification tracking system 102 performs an act 412 of generating an image metadata file with image modifications to the first version of the digital image. To illustrate, in some embodiments, the image modification tracking system 102 does not generate an image metadata file after the act 406 of saving the first version of the digital image because the first version had no modifications to the digital image.

Furthermore, FIG. 4 shows the client device(s) 400 accessing the second version of the digital image. For example, the client device(s) 400 access the second version of the digital image, e.g., the first version of the digital image with image modifications. In particular, FIG. 4 shows the client device(s) 400 applying modifications to the second version of the digital image, which prompts the client device(s) 400 to send the image modification data to the image modification tracking system 102. As further indicated by FIG. 4, the client device(s) 400 perform an act 414 of modifying the second version of the digital image and the image modification tracking system 102 receives the applied modifications to the second version of the digital image. To illustrate, similar to the image modification tracking system 102 receiving image modification data from the act 408, the image modification tracking system 102 also receives image modification data from the act 414. The image modification tracking system 102 receives data representing modifications to the second version, such as applying brush strokes, adding layers, applying paint tools, erasers, blurring tools, and filters.

In addition to generating the first and second versions of the digital image, as indicated by FIG. 4, the image modification tracking system 102 generates a third version of the digital image. For example, FIG. 4 shows the image modification tracking system 102 performing an act 416 of generating and saving a third version of the digital image. In particular, like the act 410 of generating and saving the second version of the digital image, the image modification tracking system 102 generates a third version due to the modifications performed to the second version of the digital image.

As further shown in FIG. 4, in response to the act 416, the image modification tracking system 102 generates an updated image metadata file. For example, FIG. 4 shows an act 418 of generating an updated image metadata file with image modifications to the first and second versions. In particular, the image modification tracking system 102 utilizes the image metadata file discussed in regard to act 412 and updates the image metadata file with data relating to the modifications to the second version. Alternatively, in one or more example embodiments, the image modification tracking system 102 generates a new image metadata file for each new version of the digital image.

After one or more client devices modify one or more versions of a digital image, another client device may access a version of the digital image. As shown in FIG. 4, the client device 402 performs an act 420 of selecting a point of interest within a selected digital image. In particular, the client device 402 selects, in one or more implementations, the third version of the digital image, and the image modification tracking system 102 provides for display the third version of the digital image within a graphical user interface of the client device 402. To illustrate, the client device 402 then performs the act 420 of selecting the point of interest within the third version of the digital image.

In addition to the client device 402 selecting the point of interest, the image modification tracking system 102 then receives the data from client device 402. For example, FIG. 4 shows the image modification tracking system 102 performing an act 422 of receiving the selected point of interest. In particular, the image modification tracking system 102 receives metadata components corresponding to the selected point of interest. To illustrate, the metadata components corresponding to the selected point of interest include data, such as pixel value data, coordinates of the point of interest, and bounding box coordinates.

In addition to the act 422 of receiving the selected point of interest, the image modification tracking system 102 also performs an act of determining image modifications. For example, the image modification tracking system 102 performs an act 424 of determining image modifications to the point of interest based on the image metadata file. In particular, the image modification tracking system 102 utilizes the aforementioned image metadata file to determine image modifications to the point of interest. For instance, the image modification tracking system 102 receives the point of interest and corresponding outputs, such as coordinates of the point of interest.

In one or more implementations, to determine image modifications, the image modification tracking system 102 utilizes pixel coordinates of the point of interest. In some embodiments, the image modification tracking system 102 iterates over all entries within the image metadata file with the coordinates of the point of interest to identify corresponding sections for the point of interest within the image metadata file. To illustrate, after the image modification tracking system 102 identifies all corresponding sections (corresponding version of the digital image and either region or object), the image modification tracking system 102 determines modifications to the point of interest.

In some embodiments, when performing the act 424 of determining image modifications, the image modification tracking system 102 determines modifications by performing a subtraction operation. In particular, the image modification tracking system 102 performs a subtraction operation on the composite of the previous version(s) identified as relevant with the currently selected digital image. To illustrate, the image modification tracking system 102 calculates a delta value between previous versions and the selected version for the bounding box around the point of interest. Furthermore, the subtraction operation finds the difference between RGB pixel values and a value greater than 0 indicates a modification to the point of interest.

Turning to the next act performed by the image modification tracking system 102, the image modification tracking system 102 performs an act 426 of generating a summary. For example, in some embodiments, the image modification tracking system 102 compiles a list of the image metadata file for the image modifications to the point of interest from the different versions of the digital image. In particular, in certain implementations, the image modification tracking system 102 orders the list of the image metadata file for the image modifications by author, version, timestamp, and/or image modification types.

After the image modification tracking system 102 performs the act 426 of generating the summary, the image modification tracking system 102 provides the summary for display to the client device 402. For example, the image modification tracking system 102 performs an act 428 of providing for display the summary of image modifications corresponding with the point of interest. In particular, the act 428 includes providing a summary that includes textual information of the image modifications to the point of interest. In one or more implementations, the summary also includes visual indicators of one or more image modifications. To illustrate such a visual indicator, in some cases, the image modification tracking system 102 highlights the image modifications corresponding to the point of interest.

In one or more implementations, the visual indicators for the summary include using an object mask. In particular, the image modification tracking system 102 identifies and determines the image modifications to the corresponding point of interest and retrieves metadata for an object mask corresponding to the image modifications from the image metadata file. To illustrate, the metadata includes the pixel values to generate the object mask and the image modification tracking system 102 generates the object mask based on the metadata and highlights the image modifications corresponding to the point of interest. In instances where the image modifications to the point of interest correspond with a region, the image modification tracking system 102 highlights portions of the region corresponding to the image modifications.

Figure 5:
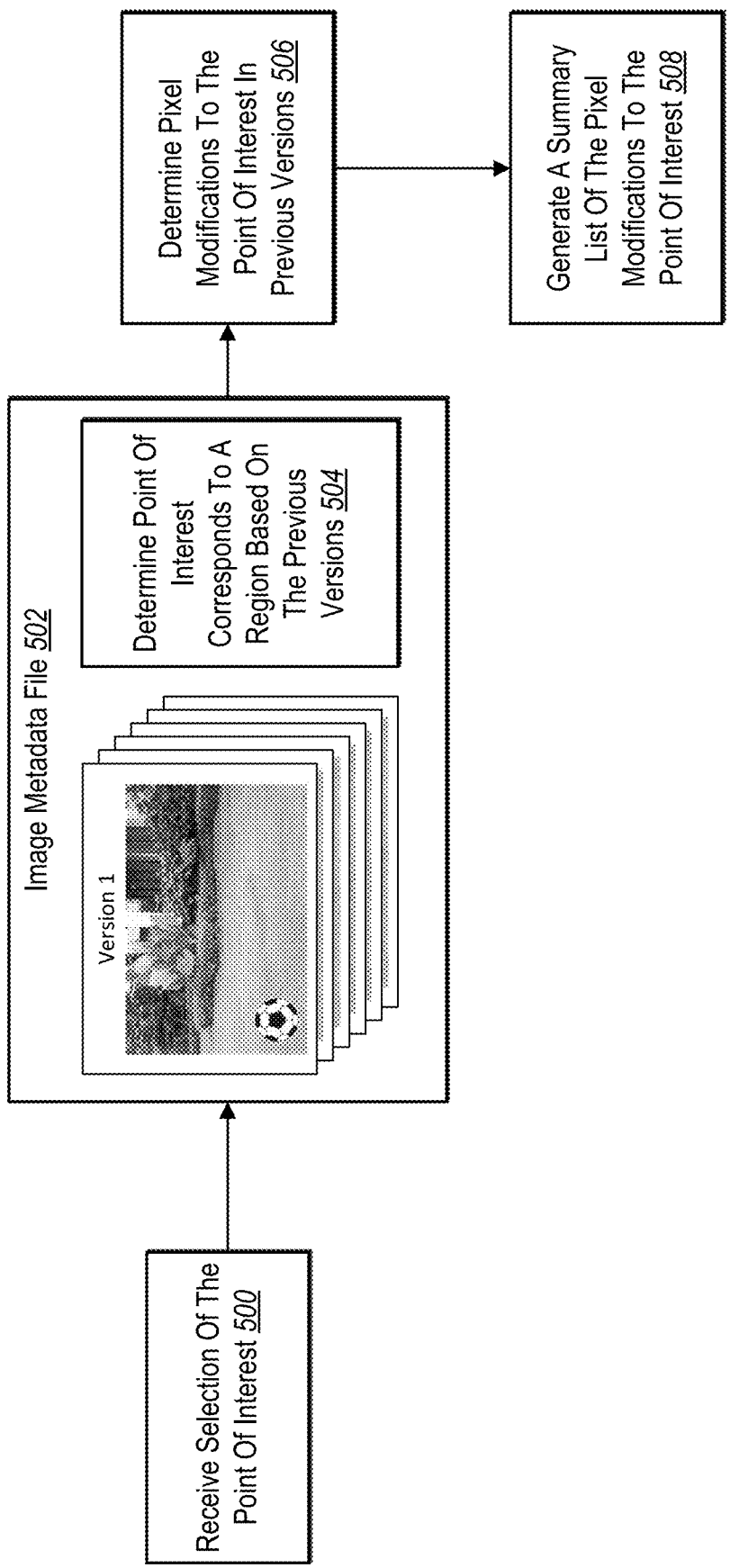
FIG. 5 illustrates a block diagram of the image modification tracking system determining a point of interest corresponds to a region and adding a summary of the image modification(s) to a list of the image metadata file in accordance with one or more embodiments.

As discussed above, the image modification tracking system 102 determines whether a point of interest corresponds with an object or a region. In accordance with one or more embodiments, FIG. 5 shows the image modification tracking system 102 determining that the point of interest corresponds to a region based on the previous versions of the digital image and generating a summary of the pixel modifications to the point of interest. For example, FIG. 5 shows the image modification tracking system 102 receiving a selection of a point of interest 500 and metadata components corresponding with the point of interest.

As part of the process of receiving the selection of the point of interest 500, the image modification tracking system 102 processes and analyzes the digital image corresponding with the point of interest 500. Not only does the image modification tracking system 102 process and analyze the digital image for receiving the selection of the point of interest 500, but, in some embodiments, the image modification tracking system 102 also processes and analyzes the digital image for all modifications and versions of the digital image saved to the digital image collaboration system 108 via the image modification tracking system 102. In particular, the image modification tracking system 102 utilizes a detection neural network to process and analyze the digital image. In response to receiving data for a version of the digital image (e.g., modification data or point of interest data), the image modification tracking system 102 processes the version of the digital image and generates a neural network output.

In one or more implementations, the image modification tracking system 102 utilizes ResNet-101 as the detection neural network. In particular, the image modification tracking system 102 trains the ResNet-101 on an open image dataset. In some cases, the open image dataset includes millions of images with label annotations, bounding boxes for regions and objects, and thousands of different digital image classes. To illustrate, the detection neural network generates outputs that include bounding box metadata for objects and regions within the digital image, a label for detected objects and regions, a confidence score for each of the bounding boxes indicating a level of confidence for the label, and metadata related to generating an object mask for detected objects.

In addition to receiving the selection of the point of interest 500 and using a detection neural network to analyze a digital image, as shown in FIG. 5, the image modification tracking system 102 utilizes an image metadata file 502 to eventually generate a summary of the image modifications to the point of interest 500. The following paragraphs provide more details relating to the image metadata file 502 generally in regard to using the image metadata file 502 to determine the point of interest corresponds to a region and to determine image modifications to the point of interest 500.

As mentioned above, the image modification tracking system 102 processes the digital image version or the point of interest 500. For example, the image modification tracking system 102 processes the digital image version or the point of interest 500 via the detection neural network, and the detection neural network sends a payload with the neural network outputs for storing within the image metadata file 502. Table 1 shows pseudocode of a payload with the neural network outputs for storage within the image metadata file:

ComponentVersion{ ImageVersion: int bounds:Rect DetectionType: ObjectID / RegionID ModificationDate: Date ID:Int Author: UserID Rendition:blob .... }

As shown by the pseudocode in table 1, the image modification tracking system 102 receives the payload of the neural network outputs from the processed version of the digital image (via the detection neural network) and maps the received payload to the image metadata file 502. For a payload for a point of interest 500, the image modification tracking system 102 identifies corresponding sections of the image metadata file 502 with the point of interest 500. In the pseudocode of table 1, the payload values include a digital image version (e.g., version 1, version 2, etc.), a bounds value, an identifier (e.g., object or region identifier), a timestamp, an author, and thumbnail data.

As mentioned in the previous paragraphs and shown in table 2 below, in some embodiments, the image modification tracking system 102 retains or includes data indications of modifications to the different versions of the digital image within the image metadata file 502. For example, the image modification tracking system 102 generates or updates an image metadata file in response to modified components within the digital image, and the image metadata file 502 stores metadata pointers corresponding to the modified components. The metadata pointers assist the image modification tracking system 102 to identify and determine corresponding digital image versions as well as specific modifications corresponding to the point of interest 500. Table 2 below shows example pseudocode relating to an image metadata file:

{"state": "unmodified", "manifest-format-version": 6, "type": "document/vnd.adobe.cpsd+dcx", "cpsd#mode": "RGBColorMode", "typeVersion": 8, "name": "", "cpsd#sheet-count": 4, "components": [{"path": "META-INF / metadata.xml", "xmp-metadata", "state": "unmodified", "id": "f506b057-cedf-4586-937d-be7ed12149d6", "type": "application/rdf+xml", "rel": "metadata"},
{"component-id": "d3lef3ef-83c1-45ee-9a91-c3d42eafa01c", "path": "image-resources", "state": "modified",
"type": "application/vnd.adobe.cpsd-doc-image-resources",
"bounds": "10,10, 300,600",
"modifiedObjectIds": "{
| | {"adasdad123213131", {15,30,100,100}}, -continued

```
|   |    {"adasdqweq1q32333",              {500,30,100,100}},
|   |    {"sdkfjdsf2434dsff",               {400,60,200,300}}
|   }"
}
{"component-id": "77d008bc-4a8f-487f-9349-7f60647c23e1, "path": "layer-image-data-id-1",
"state": "unmodified", "type": "application/vnd.adobe.cpsd-doc-image-data"},
{"path": "renditions/preview.png", "name": "preview", "state": "unmodified",
"id": "873130ca-1db9-4c1a-8c91-3dfb879f19f6", "type": "image/png", "height": 1297,
"width": 1812, "rel": "rendition"}]},
{"path": "layer-id-5", "name": "Ellipse 1", "id": "07549f7a-8232-46db"af78-28a0f4f5e926",
"cpsd#layer-node-kind": "vector", "rel": "layer", "cpsd#layer-id" :5}, {"path", "layer-id-7",
"name": "test", "cpsd#text-data": "test", "cpsd#combined-channel-data": true, "id":
"a4ba2574-9ca7-4266-86d2-9d212ead6236", "cpsd#layer-node-kind": "text", "rel": "layer",
"cpsd#layer-id": 7, "cpsd#layer-bounds": {"right": 1832, "bottom": 400, "left": 821, "top":
12}, "cpsd#generational-guid": "296eaa52-b118-c844-8f8a-4ba0503412f7", "components": [
{"path": "renditions/preview.png", "name": "preview", "state": "unmodified",
"id": "58ac56ad-e1b4-49fd-a13b-5ec4d3f58a74", "type": "image/png", "height": 388,
"width": 1011, "rel": "rendition"}]}],
"x":0, "y":0, "height": 1417, "width": 1890}], "modified: "2020-04-11T12:57:18Z".
"cpsd#timestamp": 1650383838035, "cpsd#channels", 3}
```

As shown in table 2, the pseudocode indicates the image modification tracking system 102 recording information in the image metadata file 502, such as whether a modification corresponds to an object or region, the date/time of modification, modification author, a unique ID (corresponding to a specific object), location identifier for a region, a modification type, bounds, and a version of the digital image. In particular, for a version of the digital image processed by the detection neural network, the pseudocode in table 1 maps to the image metadata file 502 (pseudocode in table 2) by being recorded in the appropriate section for a digital image version and object/region section with all the corresponding payload values sent from the detection neural network. Accordingly, the image metadata file 502 records all modifications performed on a digital image.

As discussed in an earlier figure, the image modification tracking system 102 utilizes bounds of the point of interest within the image metadata file 502. For example, bounds of the point of interest includes location coordinates of the point of interest. In particular, for identifying image modifications, the image modification tracking system 102 utilizes location coordinates to identify the area within previous versions modified within the digital image. To illustrate, in some cases, the location coordinates contain changes, such as object/region, layer changes, objects/regions moved, and new objects/regions. Accordingly, the image modification tracking system 102 utilizes the location coordinates as an additional identifier within the image metadata file 502 for determining whether to the point of interest 500 corresponds to a region.

In addition to the bounds, the image modification tracking system 102 retains within the image metadata file 502 location identifiers. In particular, the image modification tracking system 102 retains a list of location identifiers corresponding to different regions The image modification tracking system 102 utilizes the location identifiers to efficiently and accurately identify corresponding sections of the image metadata file 502 to the point of interest 500.

In addition to the prior paragraphs detailing the image metadata file 502, the following paragraphs discuss receiving the point of interest 500 and performing an act of determining whether the point of interest 500 corresponds with a region by utilizing the image metadata file 502. For example, the image modification tracking system 102 performs an act 504 of determining the point of interest corresponding to a region based on the previous versions of the digital image. In particular, the image modification tracking system 102 performs the act 504 by utilizing an image metadata file 502. To illustrate, in some cases, the image metadata file 502 includes the image modifications from all versions of the digital image and the image modification tracking system 102 iterates through all the versions of the digital image to determine the point of interest corresponds to a region.

In one or more implementations, the image modification tracking system 102 determines whether the point of interest corresponds with a region by utilizing, for example, the bounds of the point of interest. In particular, as shown above in table 1 and table 2, the image modification tracking system 102 iterates through sections of the image metadata file 502 with a location identifier and bounds/location coordinates of the point of interest 500. To illustrate, an identifier and/or bounds/location coordinates of the point of interest 500 allows the image modification tracking system 102 to efficiently match the point of interest 500 to the region section of the image metadata file 502.

To further illustrate the above paragraph, the image modification tracking system 102 utilizes the location coordinates to find a match within either the region section or the object section of the image metadata file 502. The image modification tracking system 102 determines in some instances that the location coordinates of the point of interest 500 match with the region section of the image metadata file 502, and, as such, determine that the point of interest 500 corresponds with the region.

Alternatively, in one or more implementations, the image modification tracking system 102 receives an indication from a user of the client device that the point of interest 500 corresponds to the region. In particular, in response to the selection of the point of interest 500, the image modification tracking system 102 provides an option for the user of the client device to indicate that the selection corresponds to a region, not an object. To illustrate, in response to the client device indicating to the image modification tracking system 102 that the point of interest 500 corresponds to the region, the image modification tracking system 102 skips directly to a region section of the image metadata file 502 and identifies previous version(s) and image modifications for the point of interest 500.

In addition to the act 504 of determining the point of interest corresponds to a region, the image modification tracking system 102 also performs an act 506 of determining pixel modifications to the point of interest in previous versions of the digital image. In particular, in some embodiments, the image modification tracking system 102 identifies all previous versions of the digital image corresponding to the point of interest 500 based on the image metadata file 502. To illustrate, the image modification tracking system 102 performs a subtraction function between different versions of the digital image. To do so, the image modification tracking system 102 utilizes the selected version of the digital image with the point of interest 500 and performs a subtraction operation between the selected version and any previous version of the digital image that corresponds with the point of interest 500. Specifically, the image modification tracking system 102 performs the subtraction operation to determine a delta value between the selected version and previous version of the digital image.

In one or more implementations, in addition to performing the subtraction function, the image modification tracking system 102 generates a list for the image metadata file. In particular, the image modification tracking system 102 generates the list for the image metadata file with each identified modification to the point of interest stored within the list. To illustrate, the subtraction operation mentioned above identifies the presence of modifications to a specific version of the digital image, which alerts the image modification tracking system 102 to identify the specific modification within that specific version based on the image metadata file 502. The image modification tracking system 102 then places the specific modification within the list of the image metadata file 502. Accordingly, the image modification tracking system 102 utilizes lists of the image metadata file, such as M(1), M(2) . . . M(n), where the M represents modifications for a point of interest and the number indicates the version of the digital image. Accordingly, all modifications in an M(1) list relate to modifications to the point of interest 500 for a first version of the digital image.

In one or more implementations, the act 506 of determining pixel modifications to the point of interest includes the image modification tracking system 102 receiving the cartesian coordinates of the point of interest 500 and comparing the cartesian coordinates of the point of interest 500 with the coordinates of other components within the image metadata file for each of the previous versions. To illustrate, an intersection of coordinates between the point of interest 500 and a component within the image metadata file 502 indicates image modifications to a corresponding previous version(s) and region.

Furthermore, in one or more implementations, for determining pixel modifications to the point of interest, the image modification tracking system 102 receives location identifiers of the point of interest. For example, the image modification tracking system 102 receives a first set of location identifiers for the point of interest for the selected version of the digital image. In particular, the image modification tracking system 102 uses a second set of location identifiers based on the image metadata file 502 that correspond with previous versions of the digital image. To illustrate, the image modification tracking system 102 further performs the act 506 of determining pixel modifications by comparing the first set of location identifiers with the second set of location identifiers.

After determining pixel modifications, as further shown in FIG. 5, the image modification tracking system 102 performs an act 508 of generating a list of the pixel modifications to the point of interest 500. Based on the list of the image metadata file 502, the image modification tracking system 102 provides the summary of the pixel modifications to the point of interest 500 for each previous version to a user of the client device.

Figure 6:
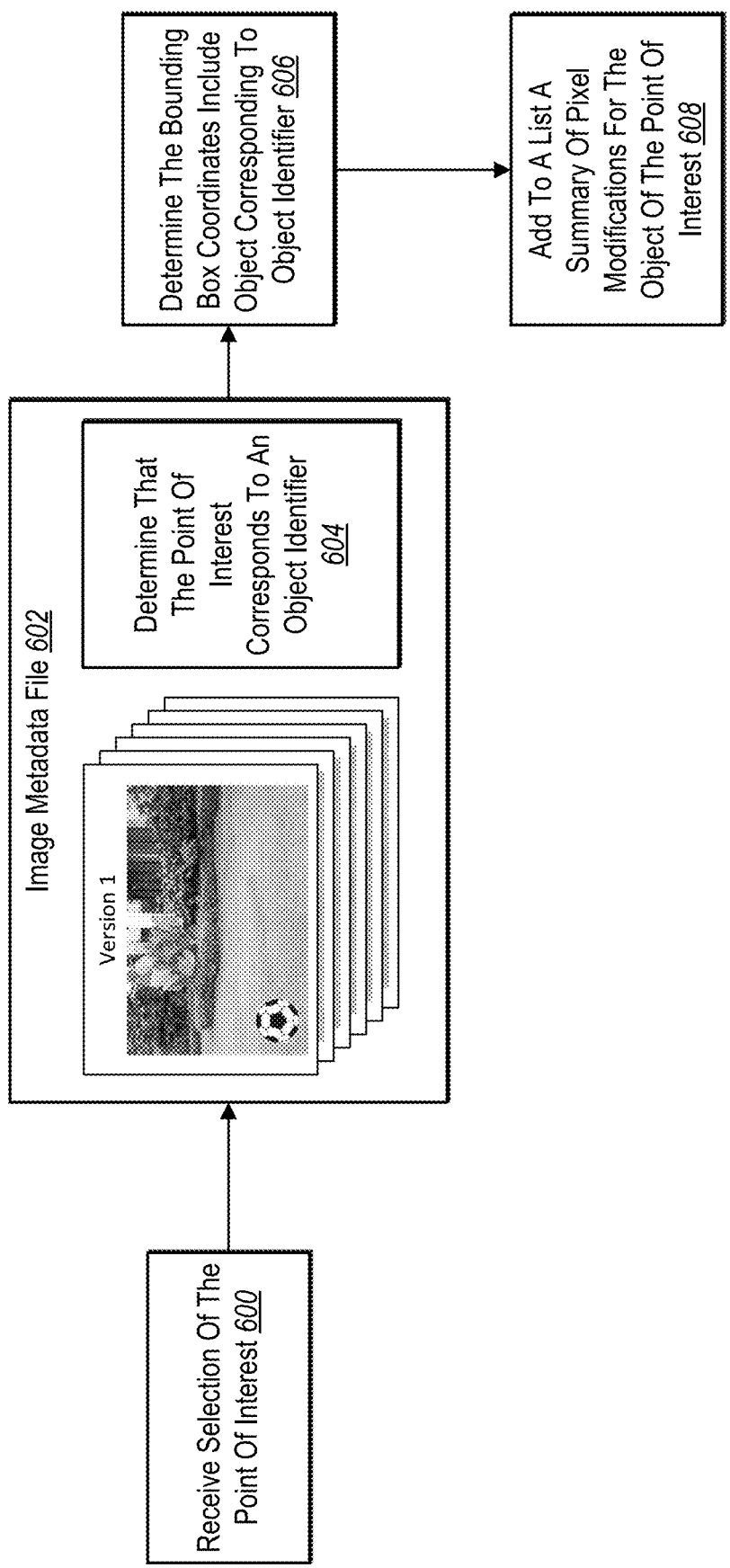
FIG. 6 illustrates a block diagram of the image modification tracking system determining a point of interest corresponds to an object identifier and adding a summary of the image modification to a list of the image metadata file in accordance with one or more embodiments.

As just discussed above, the image modification tracking system 102 determines the point of interest corresponds with the region, in other instances, the image modification tracking system 102 determines the point of interest corresponds with an object. In accordance with one or more embodiments, FIG. 6 shows the image modification tracking system 102 determining that the point of interest corresponds to an object based on the previous version(s) of the digital image. For example, FIG. 6 shows the image modification tracking system 102 receiving a selection of a point of interest 600, determining that the point of interest 600 corresponds to an object, determining pixel modifications, and generating a summary. Similar to the discussion for FIG. 5, the image modification tracking system 102 receives the selection of the point of interest 600 and metadata components corresponding with the point of interest 600.

As indicated by FIG. 6, the image modification tracking system 102 processes and analyzes the received selection of the point of interest 600 with a detection neural network and utilizes an image metadata file 602. As shown in FIG. 6, the image modification tracking system 102 determines the point of interest corresponds to an object. For example, the image modification tracking system 102 performs an act 604 of determining that the point of interest corresponds to an object identifier. In particular, the image modification tracking system 102 determines, from amongst multiple versions of the digital image listed within the image metadata file 602, that the point of interest corresponds to an object identifier. Specifically, an object identifier for an object of the selected version of the digital image corresponds with at least one of the multiple versions of the digital image within the image metadata file 602. Accordingly, the intersection between an identifier for the point of interest 600 and an object identifier within the image metadata file 602 indicates that the point of interest 600 corresponds to an object.

In addition to determining the point of interest corresponds to an object identifier, the image modification tracking system 102 also performs an act 606 of determining the bounding box coordinates include objects corresponding to the determined object identifier. In particular, in response to receiving the point of interest 600, the image modification tracking system 102 determines the coordinates of the point of interest 600. To illustrate, the image modification tracking system 102 utilizes the coordinates to find a match within the object section of the image metadata file.

As mentioned, in some embodiments, the image modification tracking system 102 utilizes bounding box coordinates to perform the act 606 to determine that the bounding box coordinates include objects corresponding to the object identifier. In addition, the image modification tracking system 102 determines pixel modifications to the object-based point of interest 600. In particular, the image modification tracking system 102 receives the bounding box coordinates of the point of interest 600 and compares the bounding box coordinates of the point of interest 600 with the bounding box coordinates of other components within the image metadata file 602 for the previous versions. To illustrate, an intersection of bounding box coordinates between the point of interest 600 and a component within the image metadata file 602 indicates (for the point of interest 600) corresponding objects and previous version(s) of the digital image.

In one or more implementations, for the act 606, the image modification tracking system 102 determines whether the point of interest corresponds with an object by utilizing, for example, the bounding box coordinates and unique identifiers (object identifiers) of the point of interest 600. In particular, in some embodiments, the image modification tracking system 102 iterates through sections of the image metadata file 602 with the unique identifier (e.g., object identifier) and bounding box coordinates of the point of interest 600. To illustrate, the unique identifier (e.g., object identifier) and/or bounding box coordinates of the point of interest 600 allows the image modification tracking system 102 to efficiently match the point of interest 600 to the object section of the image metadata file 602.

As also mentioned previously, the image modification tracking system 102 also tracks objects with a change in position between different versions of the digital image (e.g., transposed objects). For example, in one or more implementations, the image modification tracking system 102 utilizes a unique object identifier for each detected object. In some cases, the unique object identifier for a detected object corresponds with bounding box coordinates and an object label. To illustrate, the image modification tracking system 102 receives a unique object identifier for the point of interest 600 based on comparing the bounding box coordinates to other entries within the image metadata file 602. As a result, the image modification tracking system 102 utilizes the unique object identifier to identify the object in different versions of the digital image, even for transposed objects or other objects that have changed position. Because of the unique object identifier linked with the object throughout different versions of the digital image, the image modification tracking system 102 tracks the transposition of the object.

In addition to the acts 604 and 606, as further shown in FIG. 6, the image modification tracking system 102 also performs an act 608 of adding to a list a summary of pixel modifications for the object of the point of interest. In particular, in response to identifying the previous version(s) of the digital image that correspond with the bounding box coordinates of the point of interest 600, the image modification tracking system 102 generates a list of the image modifications to the point of interest 600 for each previous version. To illustrate, based on the list of the image metadata file, the image modification tracking system 102 provides the summary of the image modifications to the point of interest 600 for each previous version to a user of the client device. Similar to the discussion for FIG. 5, the image modification tracking system 102, in one or more implementations, utilizes M(1), M(2) . . . M(n) as lists of the image metadata file 602 to record object modifications (corresponding to the point of interest 600) within previous versions of the selected digital image.

Alternatively, in one or more implementations, the image modification tracking system 102 receives an indication from the client device that the point of interest 600 corresponds to an object. In particular, in response to the selection of the point of interest 600, the image modification tracking system 102 provides an option for the user of the client device to indicate that the selection corresponds to an object, not a region. To illustrate, in response to the user of the client device indicating to the image modification tracking system 102 that the point of interest 500 corresponds to the object, the image modification tracking system 102 skips directly to the object section of the image metadata file 602 and identifies previous version(s) and image modifications for the point of interest 600.

As mentioned above, the image modification tracking system 102 can provide, for display within a graphical user interface, a summary of one or more image modifications to a point of interest. Based on a user of a client device selecting a point of interest, the image modification tracking system 102 determines image modifications corresponding to the point of interest from previous versions of the digital image. In addition to the example shown in FIG. 2, FIGS. 7A-7C and FIGS. 8A-8E illustrate the image modification tracking system 102 providing, for display in graphical user interfaces of a client device, a summary of image modifications to a point of interest in accordance with one or more embodiments.

In these or other embodiments, the client devices comprise a client device application. In some embodiments, the client device application comprises computer-executable instructions that (upon execution) cause the client devices to perform certain actions depicted in the corresponding figures, such as presenting a graphical user interface of the client device application. In particular embodiments, the client device application causes CPUs, GPUs, or another processor of the client devices to perform specific acts (including those discussed above in relation to FIGS. 3-6) for sending data relating to a selected point of interest. Rather than refer to the client device application or the image modification tracking system 102 as performing the actions depicted in the figures below, this disclosure will generally refer to the client devices performing such actions for simplicity.

Figure 7B:
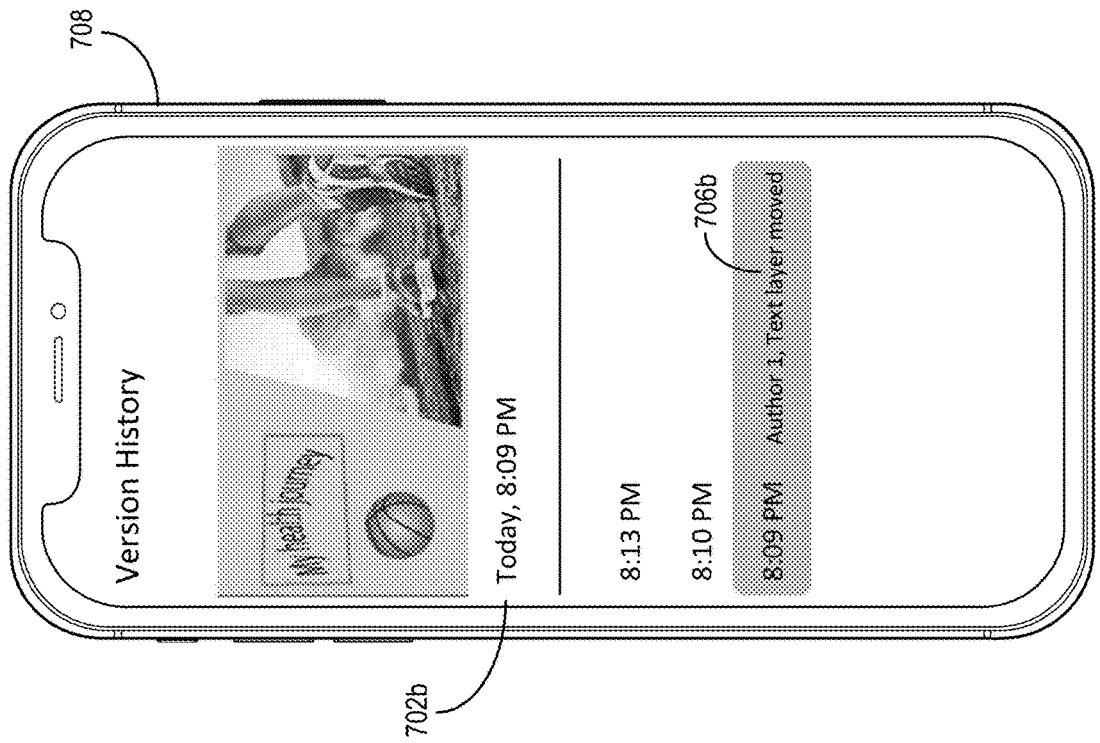
FIG. 7A-7C illustrates graphical user interfaces of the client device displaying image modifications to a region in accordance with one or more embodiments.
Figure 7A:
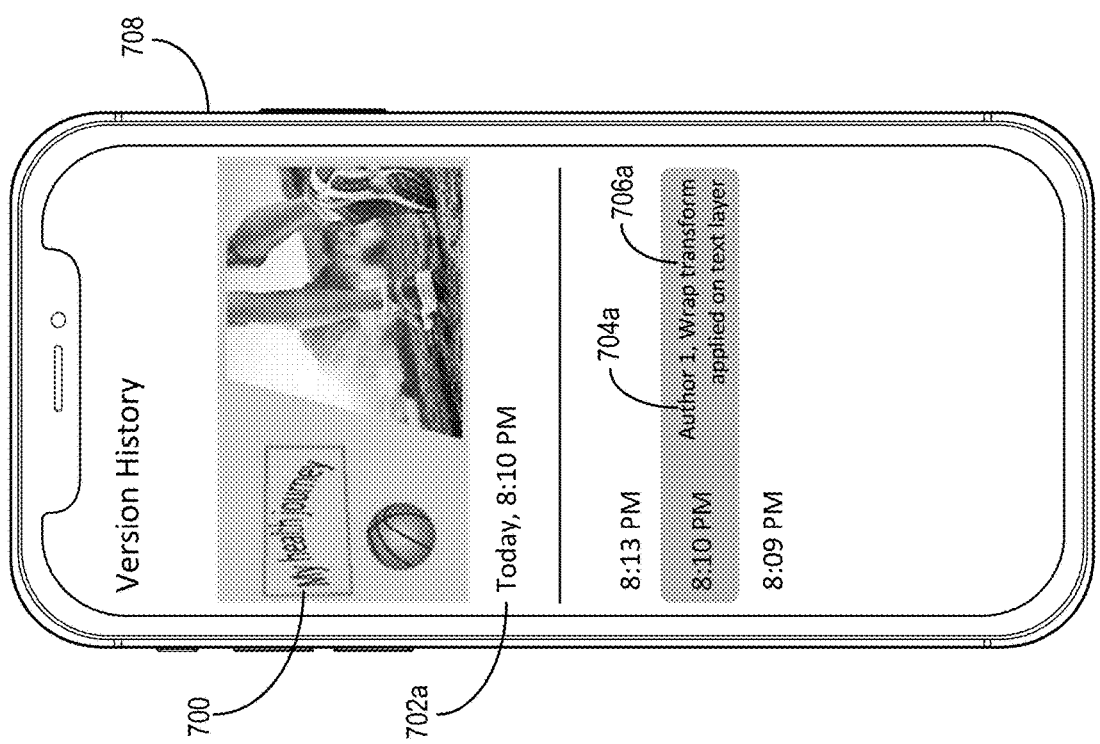
Figure 7C:
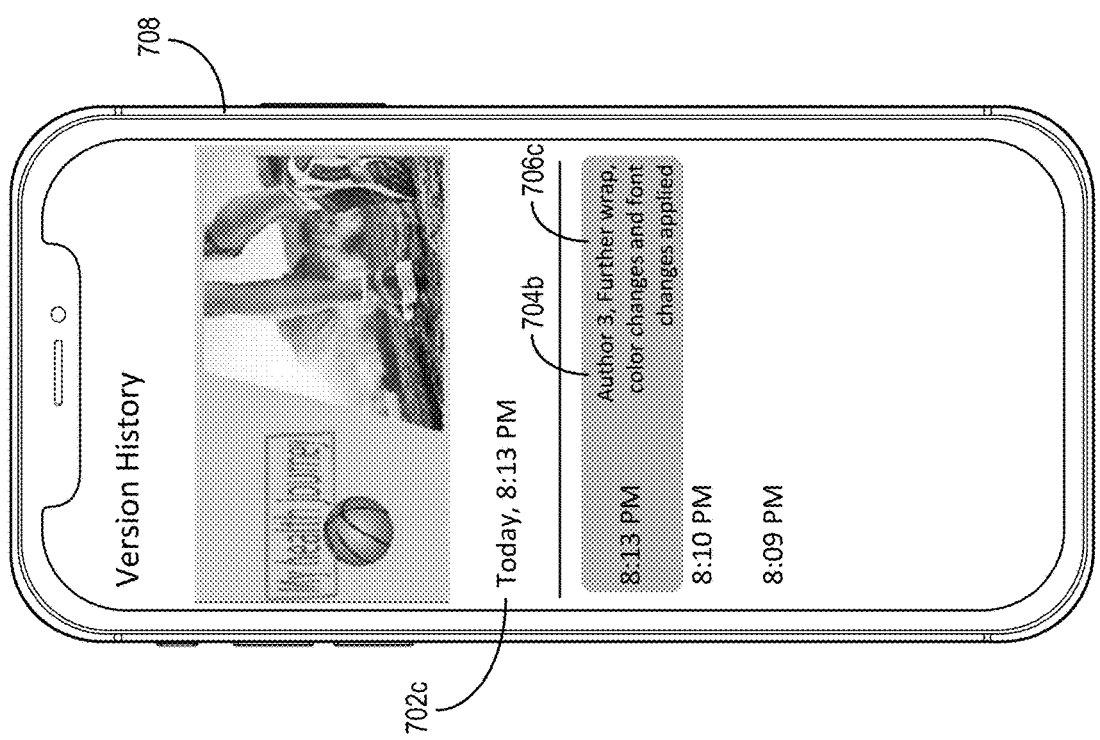

As mentioned above, the summary provided for display to a user of a client device for a point of interest corresponds with a region or an object. FIGS. 7A-7C show a client device 708 presenting example graphical user interfaces of a summary for modifications to the point of interest displayed on the client device. Specifically, FIGS. 7A-7C show the client device 708 presenting a summary for a region of a selected digital image. As just mentioned, the summary includes image modifications to the point of interest. For example, like FIG. 2, FIGS. 7A-7C illustrate a timestamp within the summary. In particular, the image modification tracking system 102 provides, for display via the graphical user interface of the client device 708, the summary with the timestamp next to each image modification. In one or more implementations, the graphical user interface displays all the different versions of the digital image and shows timestamps next to each of the versions of the digital image. Furthermore, timestamps within the displayed summary include a date, a time, and, in one or more implementations, a time reference such as "today" or "yesterday."

Additionally, in some embodiments, the summary provided by the image modification tracking system 102 includes an image modification author. For example, the summary includes the image modification author because multiple authors via the digital image collaboration system 108 accesses the digital image. In particular, for a digital image file where multiple authors collaborate, the image modification tracking system 102 tracks modifications performed by each author. To illustrate, the summary displays the image modification author next to each version of the digital image and next to each image modification. Furthermore, the image modification author within the summary in one or more implementations displays a name, a unique author ID, or a reference such as "author 1."

Moreover, the client device 708 presents the summary (provided by the image modification tracking system 102) to include an image modification type. For example, the image modification type includes a description of the modification performed by the author. In particular, the description of the modification performed by the author includes the tool employed by the author such as a brush or blur tool. To illustrate, the summary includes the image modification type as "ball added." Furthermore, the summary also includes image modification types, such as "ball rotated," "ball color changed (black to red)," "ball moved," and "ball color changed (white to green)." Accordingly, the summary includes an image modification type based on any pixel value changes to a point of interest.

For example, FIG. 7A shows a graphical user interface of the client device 708 and a region 700 selected as the point of interest. In particular, FIG. 7A also shows a summary of modifications and metadata relating to the modifications. To illustrate, FIG. 7A shows a timestamp 702a of "Today, 8:10 PM," an image modification author 704a of "author 1," and an image modification type 706a of "wrap transform applied on text layer." Furthermore, FIG. 7A shows the 8:10 PM timestamp highlighted within the graphical user interface. In one or more implementations, the client device detects a tap of a timestamp from the list of timestamps, and, based on the detected selection, the client device 708 shows the summary of image modifications to the point of interest at the selected timestamp.

As illustrated by FIG. 7B, the client device 708 presents, within a graphical user interface, a summary of the image modifications to the point of interest for a different timestamp. For example, FIG. 7B shows a timestamp 702b as "today, 8:09 PM," and an image modification type 706b of "text layer moved." In particular, in contrast to FIG. 7A, FIG. 7B shows at the client device 708 a highlight at the 8:09 timestamp, which indicates a different image modification type 706b. As shown by the transition between FIGS. 7A and 7B, the region 700 encompassing the text box for "my health journey" moves from one position to another position demarcated by location identifiers.

As illustrated by FIG. 7C, the client device 708 shows a summary of the image modifications to the point of interest for a different timestamp. For example, the client device 708 shows a timestamp 702c as "today, 8:13 PM," an image modification author 704b as "author 3," and an image modification type 706c as "further wrap, color changes and font changes applied." Based on detecting a user selection of the 8:13 timestamp, the client device 708 highlights the 8:13 timestamp, resulting in the summary showing different image modifications.

In one or more implementations, the client device 708 displays a thumbnail of the digital image version next to each timestamp of the summary. For instance, in FIGS. 7A-7C, the summary shows multiple timestamps with options to select a timestamp to view the image modification types and author. In one or more example embodiments, the image modification tracking system 102 also places a thumbnail of the digital image version next to each timestamp. Based on detecting a user selection of the timestamp within the summary, the client device 708 updates the graphical user interface to display additional information corresponding to the selected time stamp, such as the image modification author and the image modification type.

Furthermore, in one or more implementations, the image modification tracking system 102 provides, for display within the summary, differences between a selected version of a digital image and the version of the digital image immediately preceding the selected version. In particular, the image modification tracking system 102 provides for display an option for the second version of the digital image and an option for the first version of the digital image. In some cases, the client device detects a user selection of the option to view the image modifications to a point of interest for the second version of the digital image. In response to this selection, the image modification tracking system 102 provides data for, and the client device 708 displays within the graphical user interface, the summary for the image modifications between the two versions. Specifically, the summary includes the image modifications corresponding with a selected point of interest.

Moreover, in one or more implementations, the image modification tracking system 102 provides a searchable list of the image modifications to a point of interest. For instance, FIGS. 7A-7C show example graphical user interfaces of the client device 708 with a summary of image modifications, a searchable list includes an option for a user of the client device to query the summary. In particular, in some cases, the client device queries the summary of image modifications based on a text search input by a user. To illustrate, in one or more implementations, the client device queries within the searchable list "author 3," "brush," "color change," or "text layer."

Although not shown, in certain embodiments, client devices comprise a graphical user interface with subsequent image frames of the digital image and summary at later time steps in the simulation. In these or other embodiments, each subsequent image frame comprises additional or alternative modifications according to the image modification tracking system 102. Moreover, in some embodiments, the client device detects additional user input to show additional information within the summary or to navigate between different points of interest.

As just discussed, in regard to FIGS. 7A-7C, the image modification tracking system 102 provides for display a summary for image modifications to a region. FIGS. 8A-8E illustrate a summary for image modifications to an object. Specifically, FIGS. 8A-8E show the preceding graphical user interface flow of FIG. 2. For example, FIGS. 8A-8E show a selected digital image where a user of a client device adds an object and applies image modifications to the added object by changing its position, changing its color, and rotating the angle of the object.

Figure 8B:
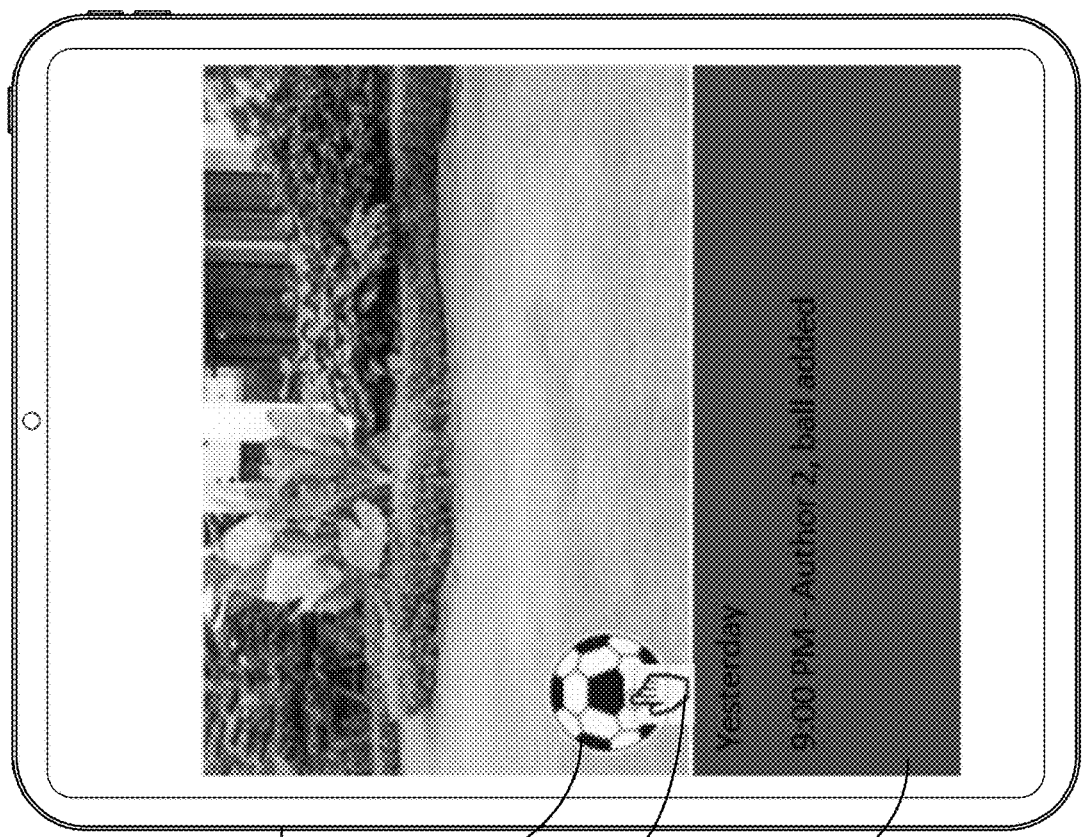
FIG. 8A-8E illustrates graphical user interfaces of the client device displaying image modifications of an object in accordance with one or more embodiments.
Figure 8A:
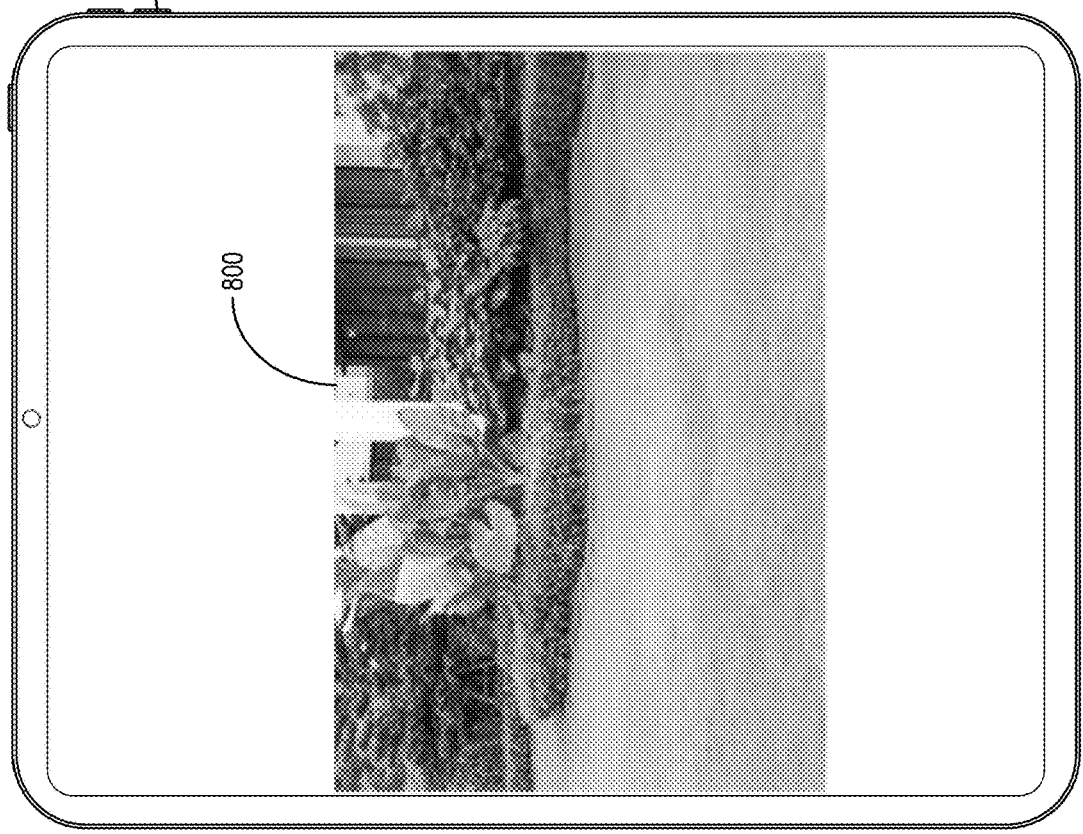

As illustrated by FIG. 8A, FIG. 8A shows a client device 801 presenting a selected digital image 800 within a graphical user interface. For example, FIG. 8A shows the selected digital image 800 with no summary accompanying the selected digital image 800. In particular, no summary accompanies the selected digital image 800 because the selected digital image 800 has no image modifications. To illustrate, the client device 801 uploads the selected digital image 800 to the digital image collaboration system 108 for collaboration with other client devices.

FIG. 8B shows the selected digital image 800 with an object 802. For example, FIG. 8B illustrates a client device 801 applying image modifications to the selected digital image 800. In particular, upon accessing the digital image in FIG. 8B, the client device 801 selects a point of interest 804 and the image modification tracking system 102 provides for display on the graphical user interface of the client device 801 a summary 806. To illustrate, the client device 801 displays a timestamp of "yesterday 9:00 PM" an image modification author of "author 2" and an image modification type of "ball added."

Figure 8D:
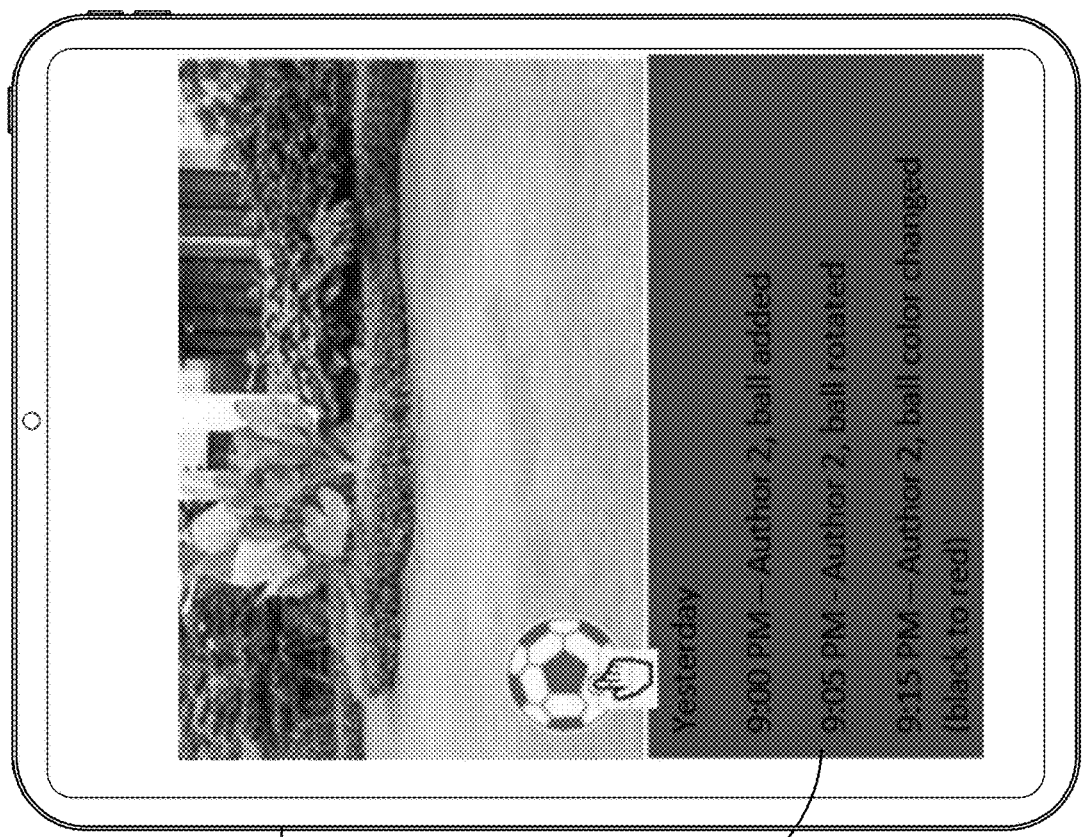
Figure 8C:
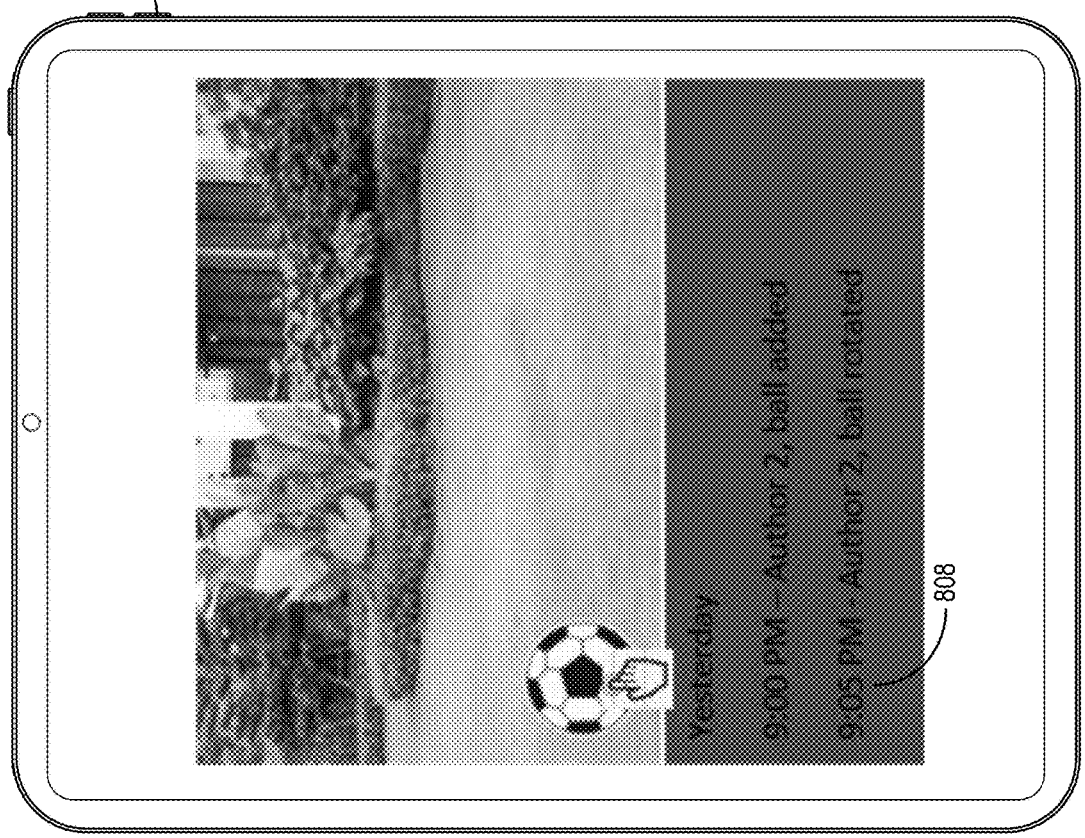

As illustrated by FIG. 8C, FIG. 8C shows the selected digital image 800 with different image modifications. For example, FIG. 8C illustrates the client device 801 accessing the selected digital image 800 and selecting the same point of interest 804 from FIG. 8B. In particular, FIG. 8C shows the client device 801 displaying an updated summary 808 of the image modifications to the point of interest 804. To illustrate, in addition to the summary 806 from FIG. 8B, the client device 801 also displays a new timestamp of "yesterday 9:05 PM" and "ball rotated."

As illustrated by FIG. 8D, FIG. 8D shows the selected digital image 800 with additional modifications. For example, FIG. 8D illustrates the client device 801 accessing the selected digital image 800 and selecting the same point of interest 804 from FIG. 8C. In particular, FIG. 8D shows an updated summary 810 of the image modifications to the point of interest 804. To illustrate, in addition to the summary 808 from FIG. 8C, the client device 801 displays a new timestamp of "yesterday 9:15 PM" and an image modification type of "ball color changed (black to red)."

Figure 8E:
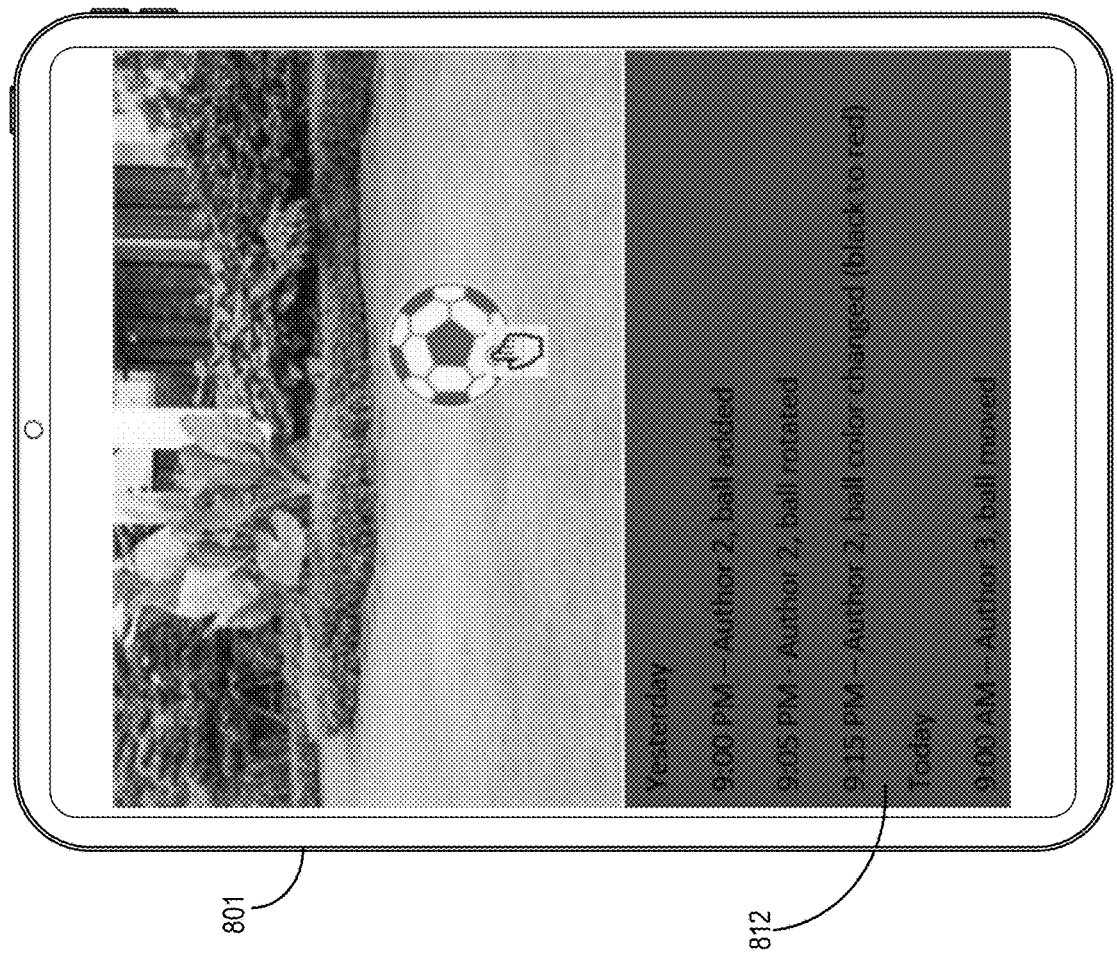

As illustrated by FIG. 8E, FIG. 8E shows a change in position to the point of interest 804. For example, FIG. 8E illustrates the client device 801 accessing the selected digital image 800 and selecting the same point of interest 804 from FIG. 8D. In particular, FIG. 8D shows an updated summary 812 of the image modifications to the point of interest 804. To illustrate, in addition the summary 810 from FIG. 8D, the client device 801 displays, within the updated summary 812, a new timestamp of "today 9:00 AM," a new image modification author of "author 3," and a new image modification type of "ball moved."

Figure 9:
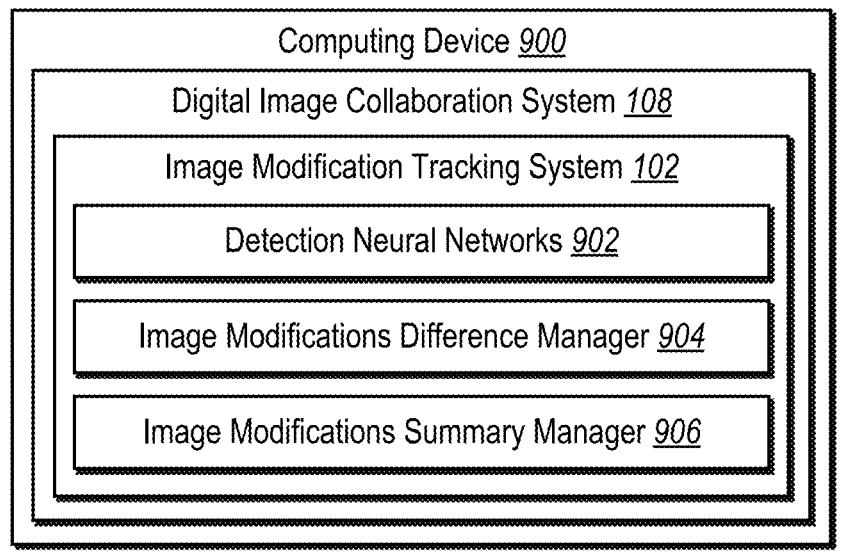
FIG. 9 illustrates a schematic diagram of an example architecture of the image modification tracking system in accordance with one or more embodiments of the present disclosure.

Referring now to FIG. 9, additional detail is provided regarding the capabilities and components of the image modification tracking system 102 in accordance with one or more implementations. In particular, FIG. 9 shows a schematic diagram of an example architecture of the image modification tracking system 102 implemented and executed on a computing device 900.

As shown, the image modification tracking system 102 is located on the computing device 900. In general, the computing device 900 may represent various types of client devices. For example, in some implementations, the client is a mobile device, such as a laptop, a tablet, a mobile telephone, a smartphone, etc. In other implementations, the computing device 900 is a non-mobile device, such as a desktop or server, or another type of client device. Additional details with regard to the computing device 900 are discussed below as well as with respect to FIG. 12.

As illustrated in FIG. 9, the image modification tracking system 102 includes various components for performing the processes and features described herein. For example, the digital image collaboration system 108, an image modifications difference manager 904, an image modifications summary manager 906, and detection neural networks 902. Each of the components mentioned above is described below in turn.

The digital image collaboration system 108 implements the image modification tracking system 102 to perform a variety of detection, selection, tracking, and generation tasks. The digital image collaboration system 108 provides the cloud environment for sharing and collaborating on digital image projects. The detection neural networks 902 detects regions and objects within a selected digital image on an image editing application on the computing device 900.

The image modifications difference manager 904 oversees the determination of image modifications to a point of interest within a selected digital image by utilizing an image metadata file. In one or more examples, the image modifications difference manager 904 utilizes the detection neural networks 902 to detect objects or regions within a selected digital image and records modifications within an image metadata file. Furthermore, in response to the image modification tracking system 102 receiving a point of interest, the image modifications difference manager 904 utilizes the image metadata file to identify modifications to the point of interest.

The image modifications summary manager 906 oversees the generation of image modification summaries and providing for display the image modification summaries to a point of interest to a user of a client device. Furthermore, the image modifications summary manager 906 collaborates with the image modifications difference manager 904 to identify the image modifications and generate a list of the image metadata file to include within the summary provided to the user.

Each of the components of the image modification tracking system 102 optionally includes software, hardware, or both. For example, the components optionally include one or more instructions stored on a computer-readable storage medium and executable by processors of one or more computing devices, such as a client device (e.g., a mobile client device) or server device. When executed by the one or more processors, the computer-executable instructions of the image modification tracking system 102 causes a computing device to receive a point of interest and determine image modifications to the selected point of interest. Alternatively, the components optionally include hardware, such as a special-purpose processing device to perform a certain function or group of functions. In addition, the components of the image modification tracking system 102 optionally includes a combination of computer-executable instructions and hardware.

Furthermore, the components of the image modification tracking system 102 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE ILLUSTRATOR, ADOBE AFTER EFFECTS, ADOBE CREATIVE CLOUD, LIGHTROOM, ELEMENTS, PHOTOSHOP EXPRESS, PHOTOSHOP MOBILE, or other digital content applications software packages. The foregoing are either registered trademarks or trademarks of Adobe Inc. in the United States and/or other countries.

Figure 10:
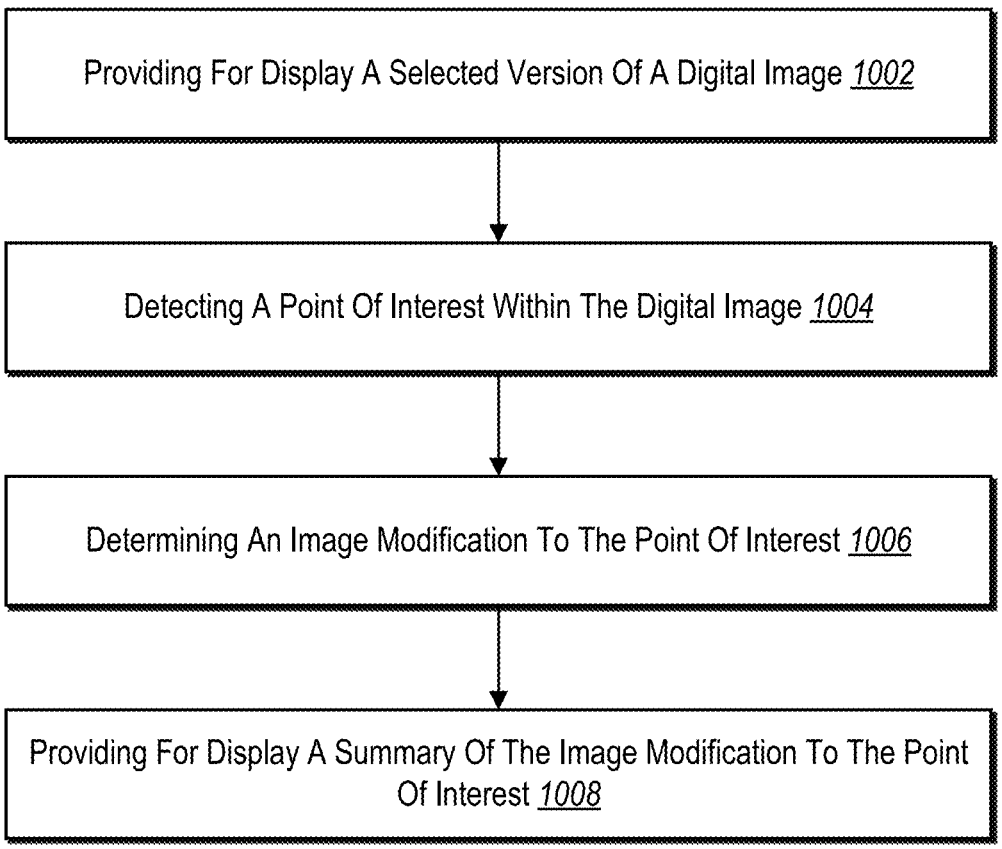
FIG. 10 illustrates an example series of acts for providing for display a summary of the image modifications to a point of interest in accordance with one or more embodiments.

FIGS. 1-9, the corresponding text, and the examples provide a number of different methods, systems, devices, and non-transitory computer-readable media of the image modification tracking system 102. In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for providing, detecting, and determining in accordance with one or more embodiments. The series of acts 1000 includes an act 1002 of providing for display a selected version of a digital image. For example, the act 1002 includes providing, for display within a graphical user interface, a selected version of a digital image.

As shown, the series of acts 1000 also includes an act 1004 of detecting a point of interest within the digital image. For example, the act 1004 includes detecting a point of interest within the selected version of the digital image. Further the act 1004 also includes receiving an indication from a client device of the point of interest within the selected version of the digital image within the graphical user interface, detecting a selection of at least one of a region or an object within the selected version of the digital image, analyzing the selected version of the digital image utilizing a detection machine-learning model, and generating, via the detection machine-learning model, bounds corresponding to an object as the point of interest. Furthermore, the act 1004 also includes determining, for the point of interest within the digital image, at least one of location coordinates for a region of the digital image or object bounding box coordinates for an object within the digital image.

As shown, the series of acts 1000 includes an act 1006 of determining an image modification to the point of interest. For example, the act 1006 includes determining an image modification to the point of interest between a previous version of the digital image and the selected version of the digital image. The act 1006 also includes determining a first set of location identifiers for the point of interest for the selected version of the digital image, determining, from on an image metadata file, a second set of location identifiers for the point of interest for the previous version of the digital image, and comparing the first set of location identifiers with the second set of location identifiers to determine the image modification to the point of interest.

Further, the act 1006 includes accessing, from an image metadata file, bounds corresponding to the point of interest within the previous version of the digital image and determining pixel value differences between the bounds corresponding to the point of interest within the previous version of the digital image and bounds corresponding to the point of interest within the selected version of the digital image.

As also shown, the series of acts 1000 includes an act 1008 of providing for display a summary of the image modification to the point of interest. For example, the act 1008 includes providing, for display within the graphical user interface, a summary of the image modification to the point of interest. The act 1008 includes providing, for display within the graphical user interface, a visual indicator for the point of interest corresponding to the summary of the image modification. Further, the act 1008 also includes providing at least one of image modification authors, image modification timestamps, or image modification types and providing a searchable list of the image modification to the point of interest.

In addition to the series of acts 1000 described above, the series of acts 1000 also includes detecting, as the point of interest, an object within the selected version of the digital image, identifying a mask corresponding to the object, and generating, for display within the graphical user interface based on the mask, a visual indicator for the point of interest within the selected version of the digital image. Furthermore, the series of acts 1000 also includes accessing, from an image metadata file, bounds corresponding to the point of interest within a previous version of the digital image, determining pixel modifications to the point of interest between the previous version of the digital image and the selected version of the digital image by comparing pixel value differences between the bounds corresponding to the point of interest within the previous version of the digital image and bounds corresponding to the point of interest within the selected version of the digital image.

Moreover, the series of acts 1000 also includes providing, for display within the graphical user interface, a summary of the pixel modifications corresponding to the point of interest, detecting an object within the selected version of the digital image, accessing the bounds corresponding to the point of interest comprises accessing, for the previous version of the digital image, previous bounds corresponding to an object as the point of interest, and determining the pixel modifications to the point of interest comprises determining a change in position of the object between the previous version of the digital image and the selected version of the digital image.

In addition, the series of acts 1000 include determining, from among multiple versions of the digital image listed in the image metadata file, that the point of interest corresponds to bounds corresponding to the pixel modifications for a region of the selected version of the digital image, and generating, for a list of the image metadata file corresponding to the summary of the pixel modifications, a description of the pixel modifications for the region of the selected version of the digital image. Further, the series of acts 1000 include determining, from among multiple version of the digital image listed in the image metadata file, that the point of interest corresponds to an object identifier for an object of the selected version of the digital image, determining, for the selected version of the digital image, that bounding box coordinates comprise the object corresponding to the object identifier for the point of interest, and adding, for a list of the image metadata file corresponding to the summary of the pixel modifications, a description of the pixel modifications for the object of the selected version of the digital image. Moreover, the series of acts 1000 includes providing a visual indicator for the point of interest corresponding to the summary of the pixel modifications, and providing at least one of pixel modification authors, pixel modification timestamps, or pixel modification types.

While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

Figure 11:
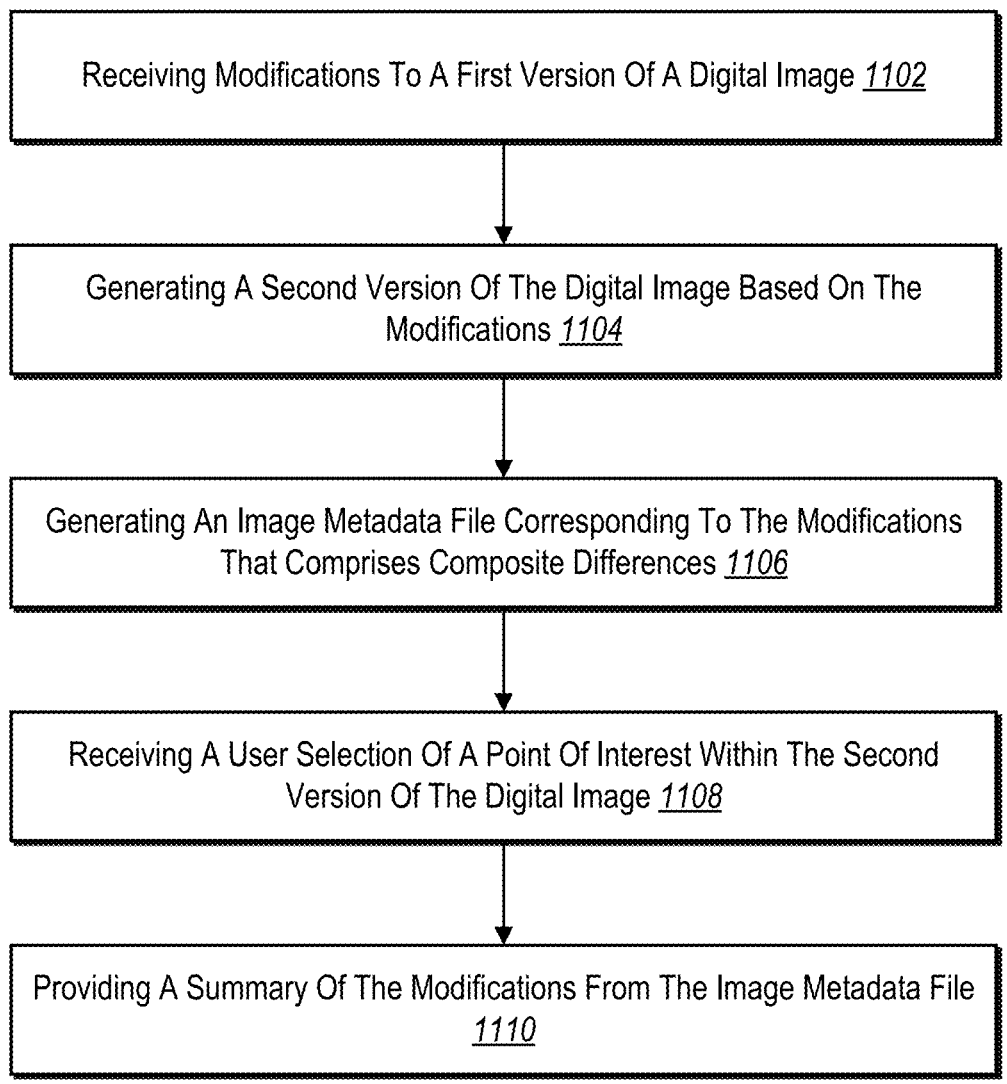
FIG. 11 illustrates an example series of acts for providing, for display from an image metadata file, a summary of image modifications to the point of interest in accordance with one or more embodiments.

FIG. 11 may be performed with more or fewer acts. Further, the acts may be performed in differing orders. Additionally, the acts described herein may be repeated or performed in parallel with one another or parallel with different instances of the same or similar acts. As mentioned, FIG. 11 illustrates a flowchart of a series of acts 1100 for receiving, generating, and providing in accordance with one or more embodiments. The series of acts 1100 includes an act 1102 of receiving modifications to a first version of a digital image. For example, the act 1102 includes receiving pixel modifications to the first version of a digital image. In addition, the series of acts 1100 includes an act 1104 generating a second version of the digital image based on the modifications. For example, the act 1104 includes generating a second version of the digital image based on the received pixel modifications.

Further, the series of acts 1100 includes an act 1106 of generating an image metadata file corresponding to the modifications that comprises composite differences. For example, the act 1106 includes generating an image metadata file corresponding to the pixel modifications that comprises composite differences between the first version of the digital image and the second version of the digital image.

Additionally, the series of acts 1100 includes an act 1108 of receiving a user selection of a point of interest within the second version of the digital image. For example, the act 1108 includes receiving a user selection of a point of interest within the second version of the digital image. Moreover, the series of acts 1100 includes an act 1110 of providing a summary of the modifications from the image metadata file. For example, the act 1110 includes providing, for display within a graphical user interface, a summary of the pixel modifications from the image metadata file that corresponds with the point of interest.

In addition, the series of acts 1100 includes receiving pixel modifications to the second version of the digital image, generating a third version of the digital image based on the received pixel modifications to the second version and generating an updated image metadata file corresponding to the pixel modifications that comprises composite differences between the first version of the digital image and the third version of the digital image and composite differences between the second version of the digital image and the third version of the digital image. Furthermore, the series of acts 1100 also includes providing, for display within the graphical user interface, an option for the second version of the digital image and an option for the first version of the digital image and based on receiving an indication of a selection of the option for the second version of the digital image, providing, for display within a graphical user interface, the summary of the pixel modifications from the image metadata file that corresponds with the point of interest.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media is any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which stores desired program code in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links for carrying desired program code in the form of computer-executable instructions or data structures and which is accessible by a general-purpose or special-purpose computer. Combinations of the above should also be included within the scope of computer-readable media.

Further, upon reaching various computer system components, program code means in the form of computer-executable instructions or data structures is transferred automatically from transmission media to non-transitory computer-readable storage media (devices) (or vice versa). For example, computer-executable instructions or data structures received over a network or data link is buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) optionally is included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure optionally are implemented in cloud computing environments. As used herein, the term "cloud computing" refers to a model for enabling on-demand network access to a shared pool of configurable computing resources. For example, cloud computing optionally is utilized in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly. A cloud-computing model optionally is composed of various characteristics such as, for example, on-demand self-service, broad network access, resource pooling, rapid elasticity, measured service, and so forth. A cloud-computing model optionally implements various service models, such as, for example, Software as a Service ("SaaS"), Platform as a Service ("PaaS"), and Infrastructure as a Service ("IaaS"). A cloud-computing model is deployable using different deployment models such as private cloud, community cloud, public cloud, hybrid cloud, and so forth. In addition, as used herein, the term "cloud-computing environment" refers to an environment in which cloud computing is utilized.

Figure 12:
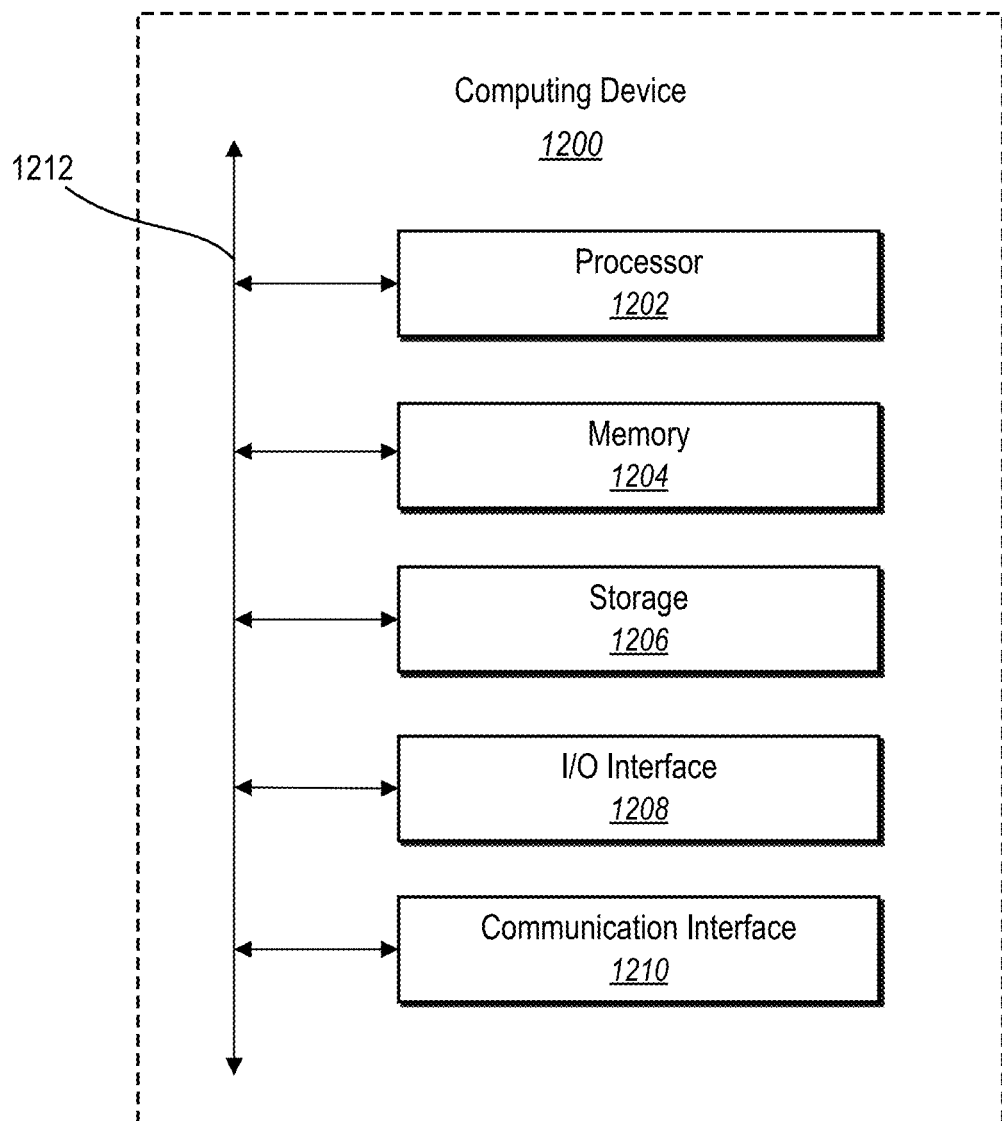
FIG. 12 illustrates a block diagram of an exemplary computing device in accordance with one or more embodiments.

FIG. 12 illustrates a block diagram of an example computing device 1200 that may be configured to perform one or more of the processes described above. One will appreciate that one or more computing devices, such as the computing device 1200 may represent the computing devices described above (e.g., computing device 1200, server device (s)104 and client devices 106 and 114). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders.

Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   providing, for display within a graphical user interface, a selected version of a digital image file;
   detecting a point of interest within the selected version of the digital image file;
   determining an image modification to the point of interest between a previous version of the digital image file and the selected version of the digital image file, the image modification comprising at least one of a change, an alteration, or an enhancement to the digital image file; and
   providing, for display within the graphical user interface, a summary of the image modification to the point of interest.

2. The computer-implemented method of claim 1, wherein detecting the point of interest comprises receiving an indication from a client device of the point of interest within the selected version of the digital image file within the graphical user interface.

3. The computer-implemented method of claim 1, wherein detecting the point of interest comprises detecting a selection of at least one of a region or an object within the selected version of the digital image file.

4. The computer-implemented method of claim 1, wherein detecting the point of interest further comprises:
   analyzing the selected version of the digital image file utilizing a detection machine-learning model; and
   generating, via the detection machine-learning model, bounds corresponding to an object as the point of interest.

5. The computer-implemented method of claim 1, wherein detecting the point of interest further comprises determining, for the point of interest within the digital image file, at least one of location coordinates for a region of the digital image file or object bounding box coordinates for an object within the digital image file.

6. The computer-implemented method of claim 1, wherein determining the image modification to the point of interest further comprises:
   determining a first set of location identifiers for the point of interest for the selected version of the digital image file;
   determining, from on an image metadata file, a second set of location identifiers for the point of interest for the previous version of the digital image file; and
   comparing the first set of location identifiers with the second set of location identifiers to determine the image modification to the point of interest.

7. The computer-implemented method of claim 1, further comprising:
   detecting, as the point of interest, an object within the selected version of the digital image file;
   identifying a mask corresponding to the object; and
   generating, for display within the graphical user interface based on the mask, a visual indicator for the point of interest within the selected version of the digital image file.

8. The computer-implemented method of claim 1, wherein providing the summary of the image modification to the point of interest comprises providing, for display within the graphical user interface, a visual indicator for the point of interest corresponding to the summary of the image modification.

9. The computer-implemented method of claim 1, wherein providing the summary of the image modification to the point of interest comprises providing at least one of image modification authors, image modification timestamps, or image modification types.

10. The computer-implemented method of claim 1, wherein providing the summary of the image modification to the point of interest comprises providing a searchable list of the image modification to the point of interest.

11. The computer-implemented method of claim 1, wherein determining the image modification comprises:
    accessing, from an image metadata file, bounds corresponding to the point of interest within the previous version of the digital image file; and
    determining pixel value differences between the bounds corresponding to the point of interest within the previous version of the digital image file and bounds corresponding to the point of interest within the selected version of the digital image file.

12. A non-transitory computer-readable medium comprising instructions that, when executed by at least one processor, cause the at least one processor to perform operations comprising:
    providing, for display within a graphical user interface, a selected version of a digital image;
    detecting a point of interest within the selected version of the digital image;
    accessing, from an image metadata file, bounds corresponding to the point of interest within a previous version of the digital image;
    determining pixel modifications to the point of interest between the previous version of the digital image and the selected version of the digital image by comparing pixel value differences between the bounds corresponding to the point of interest within the previous version of the digital image and bounds corresponding to the point of interest within the selected version of the digital image; and
    providing, for display within the graphical user interface, a summary of the pixel modifications corresponding to the point of interest.

13. The non-transitory computer-readable medium of claim 12, wherein detecting the point of interest comprises detecting an object within the selected version of the digital image.

14. The non-transitory computer-readable medium of claim 12, wherein:
    accessing the bounds corresponding to the point of interest comprises accessing, for the previous version of the digital image, previous bounds corresponding to an object as the point of interest; and
    determining the pixel modifications to the point of interest comprises determining a change in position of the object between the previous version of the digital image and the selected version of the digital image.

15. The non-transitory computer-readable medium of claim 12, wherein determining the pixel modifications to the point of interest further comprises:
- determining, from among multiple versions of the digital image listed in the image metadata file, that the point of interest corresponds to bounds corresponding to the pixel modifications for a region of the selected version of the digital image; and
- generating, for a list of the image metadata file corresponding to the summary of the pixel modifications, a description of the pixel modifications for the region of the selected version of the digital image.

16. The non-transitory computer-readable medium of claim 12, wherein determining the pixel modifications to the point of interest further comprises:
- determining, from among multiple version of the digital image listed in the image metadata file, that the point of interest corresponds to an object identifier for an object of the selected version of the digital image;
- determining, for the selected version of the digital image, that bounding box coordinates comprise the object corresponding to the object identifier for the point of interest; and
- adding, for a list of the image metadata file corresponding to the summary of the pixel modifications, a description of the pixel modifications for the object of the selected version of the digital image.

17. The non-transitory computer-readable medium of claim 12, wherein providing the summary of the pixel modifications to the point of interest comprises:
- providing a visual indicator for the point of interest corresponding to the summary of the pixel modifications; and
- providing at least one of pixel modification authors, pixel modification timestamps, or pixel modification types.

18. A system comprising:
- at least one memory device comprising a first version of a digital image; and
- at least one processor configured to cause the system to:
  - receive pixel modifications to the first version of a digital image;
  - generate a second version of the digital image based on the received pixel modifications;
  - generate an image metadata file corresponding to the pixel modifications that comprises composite differences between the first version of the digital image and the second version of the digital image;
  - receive a user selection of a point of interest within the second version of the digital image; and
  - provide, for display within a graphical user interface, a summary of the pixel modifications from the image metadata file that corresponds with the point of interest.

19. The system of claim 18, wherein the at least one processor is further configured to cause the system to:
- receive pixel modifications to the second version of the digital image;
- generate a third version of the digital image based on the received pixel modifications to the second version; and
- generate an updated image metadata file corresponding to the pixel modifications that comprises composite differences between the first version of the digital image and the third version of the digital image and composite differences between the second version of the digital image and the third version of the digital image.

20. The system of claim 18, wherein the at least one processor is further configured to: provide, for display within the graphical user interface, an option for the second version of the digital image and an option for the first version of the digital image; and
- based on receiving an indication of a selection of the option for the second version of the digital image, provide, for display within a graphical user interface, the summary of the pixel modifications from the image metadata file that corresponds with the point of interest.

* * * * *